US012672162B2

(12) United States Patent
Chen et al.

(10) Patent No.: US 12,672,162 B2
(45) Date of Patent: Jun. 30, 2026

(54) WIRELESS COMMUNICATION METHOD AND APPARATUS AND COMMUNICATION SYSTEM

(71) Applicant: 1FINITY Inc., Kawasaki (JP)

(72) Inventors: Zhe Chen, Beijing (CN); Lei Zhang, Beijing (CN); Lei Song, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 393 days.

(21) Appl. No.: 17/729,196

(22) Filed: Apr. 26, 2022

(65) Prior Publication Data

US 2022/0256554 A1 Aug. 11, 2022

Related U.S. Application Data

(63) Continuation of application No. PCT/CN2019/116418, filed on Nov. 7, 2019.

(51) Int. Cl.
| | |
|---|---|
| *H04W 72/10* | (2009.01) |
| *H04L 1/18* | (2023.01) |
| *H04L 1/1812* | (2023.01) |
| *H04L 5/00* | (2006.01) |
| *H04W 72/04* | (2023.01) |
| *H04W 72/0446* | (2023.01) |
| *H04W 72/0453* | (2023.01) |

(Continued)

(52) U.S. Cl.
CPC ........... *H04W 72/56* (2023.01); *H04L 1/1812* (2013.01); *H04L 5/0053* (2013.01); *H04W 72/0446* (2013.01); *H04W 72/0453* (2013.01); *H04W 72/23* (2023.01)

(58) Field of Classification Search
CPC ............. H04W 72/56; H04W 72/0446; H04W 72/0453; H04W 72/23; H04W 72/569; H04L 1/1812; H04L 5/0053; H04L 1/1854; H04L 5/001; H04L 5/0055
See application file for complete search history.

(56) References Cited

U.S. PATENT DOCUMENTS

| | | | |
|---|---|---|---|
| 2015/0296490 A1 | 10/2015 | Yi et al. | |
| 2017/0289995 A1* | 10/2017 | Lin | .................. H04W 72/0446 |
| 2018/0014284 A1* | 1/2018 | Yi | ......................... H04L 5/0048 |

(Continued)

FOREIGN PATENT DOCUMENTS

| | | |
|---|---|---|
| CN | 104854924 A | 8/2015 |
| CN | 109391435 A | 2/2019 |

(Continued)

OTHER PUBLICATIONS

Babaei U.S. Appl. No. 62/931,798, filed Nov. 6, 2019 (Year: 2019).*

(Continued)

*Primary Examiner* — Wutchung Chu
(74) *Attorney, Agent, or Firm* — Myers Wolin, LLC

(57) ABSTRACT

A wireless communication method and apparatus and a communication system. The wireless communication method includes: a terminal equipment receives configuration information, the configuration information indicating that one or more than one SPS configuration is associated with an SPS configuration set, the one or more than one SPS configuration corresponding to identical priorities or identical HARQ-ACK codebooks.

4 Claims, 5 Drawing Sheets

301 a terminal equipment receives first configuration information, the first configuration information indicating that one or more than one SPS configuration is associated with an SPS configuration set, the one or more than one SPS configuration corresponding to identical priorities or identical HARQ-ACK codebooks

303 the terminal equipment receives control information, an HPN field of the control information indicating the SPS configuration set

305 the terminal equipment transmits a signal used for carrying the HARQ-ACK information to which the control information corresponds at a corresponding time-domain position according to the priority or HARQ-ACK codebook to which the one or more than one SPS configuration corresponds

(51) Int. Cl.
H04W 72/23 (2023.01)
H04W 72/56 (2023.01)

(56) References Cited

U.S. PATENT DOCUMENTS

| | | | |
|---|---|---|---|
| 2018/0270722 A1 | 9/2018 | Kim et al. | |
| 2019/0028242 A1* | 1/2019 | Xiao | H04W 72/23 |
| 2019/0116608 A1 | 4/2019 | Kim et al. | |
| 2019/0132092 A1 | 5/2019 | Chen et al. | |
| 2019/0166621 A1 | 5/2019 | Yeramalli et al. | |
| 2019/0199420 A1 | 6/2019 | Faxér et al. | |
| 2019/0222349 A1* | 7/2019 | Gao | H04L 1/1819 |
| 2019/0223195 A1 | 7/2019 | Lu | |
| 2019/0246421 A1* | 8/2019 | Zhou | H04L 5/00 |
| 2019/0254081 A1* | 8/2019 | Li | H04L 5/14 |
| 2020/0229178 A1 | 7/2020 | Gao et al. | |
| 2020/0295882 A1 | 9/2020 | Wang et al. | |
| 2020/0413424 A1* | 12/2020 | Fakoorian | H04L 1/1614 |
| 2020/0413425 A1* | 12/2020 | Lin | H04L 5/0094 |
| 2021/0036822 A1* | 2/2021 | Lyu | H04L 5/0048 |
| 2021/0050948 A1* | 2/2021 | Gao | H04L 1/1812 |
| 2021/0135946 A1* | 5/2021 | Babaei | H04L 1/1854 |
| 2022/0095415 A1* | 3/2022 | Liu | H04W 80/02 |
| 2022/0159692 A1* | 5/2022 | Lee | H04W 72/23 |
| 2022/0232564 A1* | 7/2022 | Behravan | H04L 1/1854 |
| 2022/0232592 A1* | 7/2022 | Dimou | H04L 1/1861 |
| 2022/0330287 A1* | 10/2022 | Si | H04L 1/1861 |
| 2022/0337357 A1* | 10/2022 | Takahashi | H04W 72/23 |
| 2022/0338225 A1* | 10/2022 | Takahashi | H04W 72/04 |
| 2024/0048289 A1* | 2/2024 | Takahashi | H04L 1/1812 |

FOREIGN PATENT DOCUMENTS

| | | | | |
|---|---|---|---|---|
| CN | 109586877 A | | 4/2019 | |
| EP | 4 033 829 A1 | | 7/2022 | |
| KR | 20220076490 A | * | 6/2022 | H04W 72/56 |
| WO | 2017/034340 A1 | | 3/2017 | |
| WO | 2017/164698 A1 | | 9/2017 | |
| WO | 2019/160483 A1 | | 8/2019 | |
| WO | 2019/183891 A1 | | 10/2019 | |

OTHER PUBLICATIONS

Lin et al. U.S. Appl. No. 62/866,796, filed Jun. 26, 2019 (Year: 2019).*

Notice of Reasons for Refusal issued by the Japan Patent Office for corresponding Japanese Patent Application No. 2022-525445, mailed on May 23, 2023, with an English translation.

Extended European Search Report with the Supplementary European search report and the European search opinion issued by the European Patent Office for corresponding European Patent Application No. 19951557.8-1213, mailed on Nov. 8, 2022.

NTT Docomo, Inc., "Physical layer enhancements for DL SPS", Agenda Item: 7.2.6.7, 3GPP TSG-RAN WG1 Meeting #97, R1-1906219, Reno, USA, May 13-17, 2019.

ZTE, "Enhancements for DL SPS configurations", Agenda Item: 7.2.6.7, 3GPP TSG-RAN WG1 Meeting #97, R1-1906416, Reno, USA, May 13-17, 2019.

Examination Report issued by the Patent Office of India for corresponding Indian Patent Application No. 202237022888, dated Sep. 26, 2022, with an English translation.

International Search Report and Written Opinion of the International Searching Authority issued by China National Intellectual Property Administration for the International patent application No. PCT/CN2019/116418 on Aug. 12, 2020.

NTT Docomo, Inc., "Offline discussions#2 on URLLC enhanced configured grant", Agenda Item: 7.2.6.6, 3GPP TSG RAN WG1 Meeting #98bis, R1-1911690, Chongqing, China, Oct. 14-20, 2019.

Wi Rapporteur (Huawei), "RAN1 agreements for Rel-16 eURLLC", Agenda Item: 7.2.6, 3GPP TSG RAN WG1 Meeting #98bis, R1-1911728, Chongqing, China, Oct. 14-20, 2019.

Notice of Preliminary Rejection issued by the Korean Intellectual Property Office for corresponding Korean Patent Application No. 10-2022-7014633, mailed on Jul. 29, 2024, with an English translation.

NTT Docomo, Inc., "UL data transmission procedure", Agenda Item: 7.1.3.3.4, 3GPP TSG-RAN WG1 Meeting #93, R1-1807068, Busan, Korea, May 21-25, 2018.

First Notification of Office Action and Search Report issued by the China National Intellectual Property Administration for corresponding Chinese Patent Application No. 201980101360.1, mailed on Feb. 28, 2025, with an English translation.

Ericsson, "Summary of 7.1.3—Maintenance of UCI Multiplexing on PUCCH", Agenda Item: 7.1.3, 3GPP TSG-RAN WG1 Meeting #96, R1-1903364, Athens, Greece, Feb. 25-Mar. 1, 2019.

Spreadtrum Communications, "Discussion on DL SPS enhancements for URLLC", Agenda Item: 7.2.6.7, 3GPP TSG RAN WG1 #98bis, R1-1910021, Chongqing, China, Oct. 14-20, 2019.

Communication pursuant to Article 94(3) EPC issued by the European Patent Office for corresponding European Patent Application No. 19951557.8, mailed on Sep. 26, 2025.

Second Notification of Office Action and Search Report issued by the China National Intellectual Property Administration for corresponding Chinese Patent Application No. 201980101360.1, mailed on Aug. 19, 2025, with an English translation.

Third Notification of Office Action and Search Report issued by the China National Intellectual Property Administration for corresponding Chinese Patent Application No. 201980101360.1, mailed on Jan. 20, 2026, with an English translation.

Decision fof Rejection issued by CNIPA for corresponding Chinese Patent Application No. 201980101360.1, mailed on Apr. 29, 2026, with an English translation.

* cited by examiner

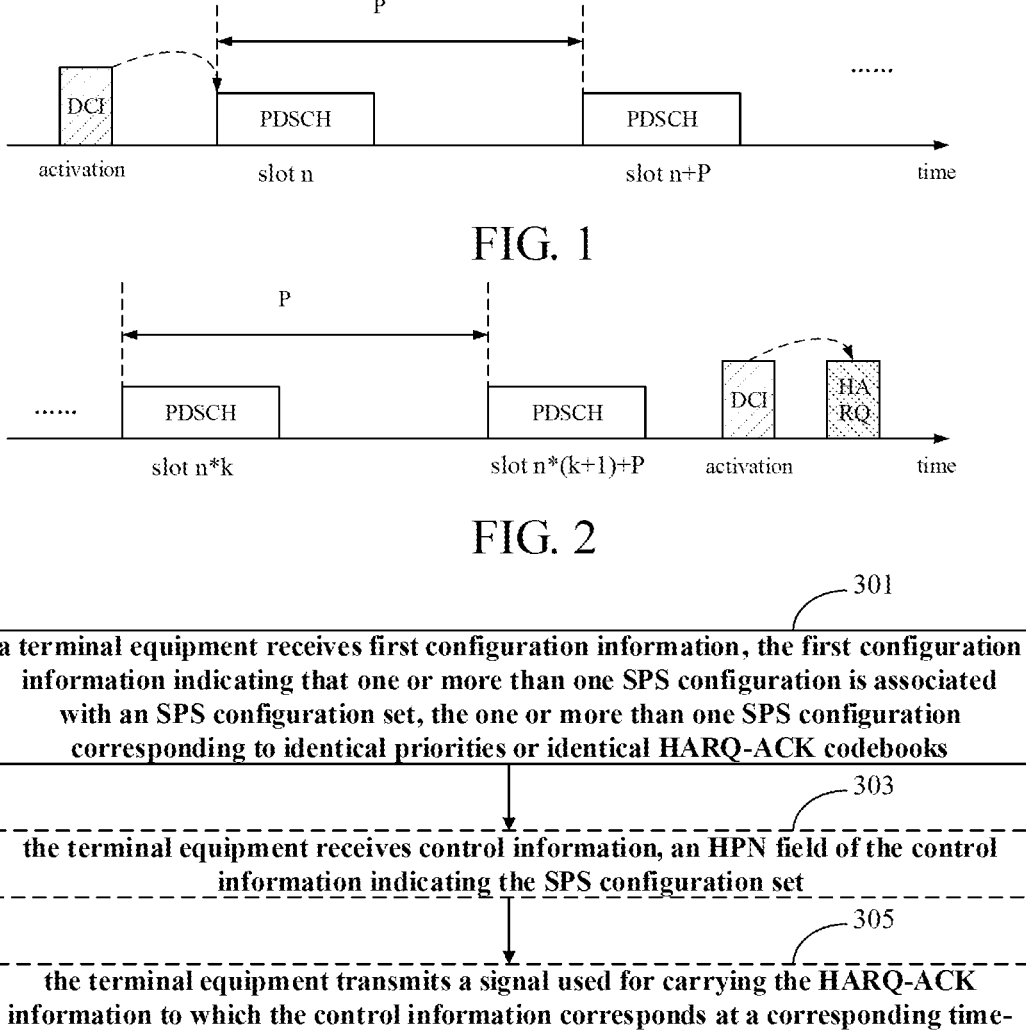

301 a terminal equipment receives first configuration information, the first configuration information indicating that one or more than one SPS configuration is associated with an SPS configuration set, the one or more than one SPS configuration corresponding to identical priorities or identical HARQ-ACK codebooks

303 the terminal equipment receives control information, an HPN field of the control information indicating the SPS configuration set

305 the terminal equipment transmits a signal used for carrying the HARQ-ACK information to which the control information corresponds at a corresponding time-domain position according to the priority or HARQ-ACK codebook to which the one or more than one SPS configuration corresponds

FIG. 3

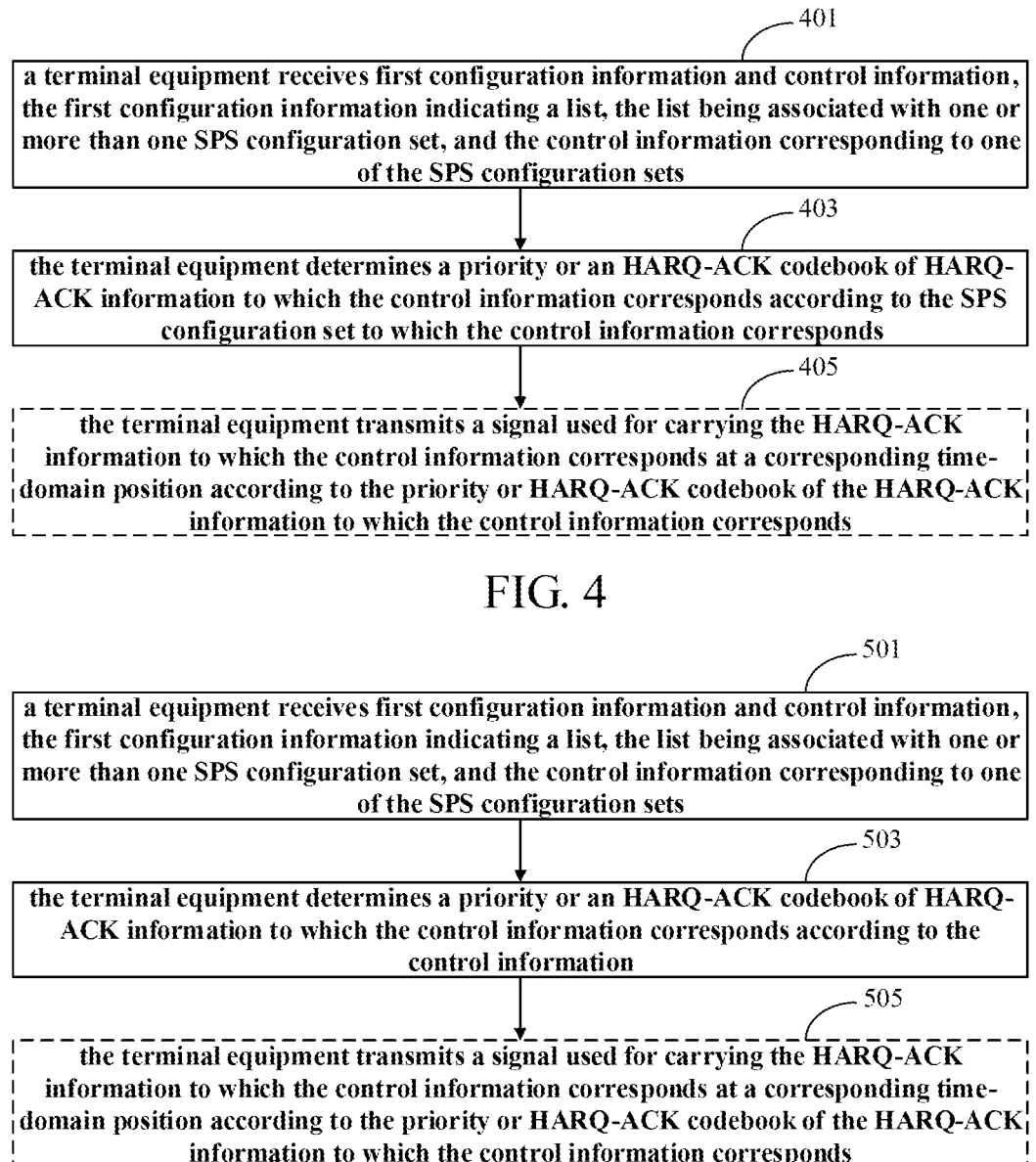

401 a terminal equipment receives first configuration information and control information, the first configuration information indicating a list, the list being associated with one or more than one SPS configuration set, and the control information corresponding to one of the SPS configuration sets

403 the terminal equipment determines a priority or an HARQ-ACK codebook of HARQ-ACK information to which the control information corresponds according to the SPS configuration set to which the control information corresponds

405 the terminal equipment transmits a signal used for carrying the HARQ-ACK information to which the control information corresponds at a corresponding time-domain position according to the priority or HARQ-ACK codebook of the HARQ-ACK information to which the control information corresponds

FIG. 4

501 a terminal equipment receives first configuration information and control information, the first configuration information indicating a list, the list being associated with one or more than one SPS configuration set, and the control information corresponding to one of the SPS configuration sets

503 the terminal equipment determines a priority or an HARQ-ACK codebook of HARQ-ACK information to which the control information corresponds according to the control information

505 the terminal equipment transmits a signal used for carrying the HARQ-ACK information to which the control information corresponds at a corresponding time-domain position according to the priority or HARQ-ACK codebook of the HARQ-ACK information to which the control information corresponds

FIG. 5

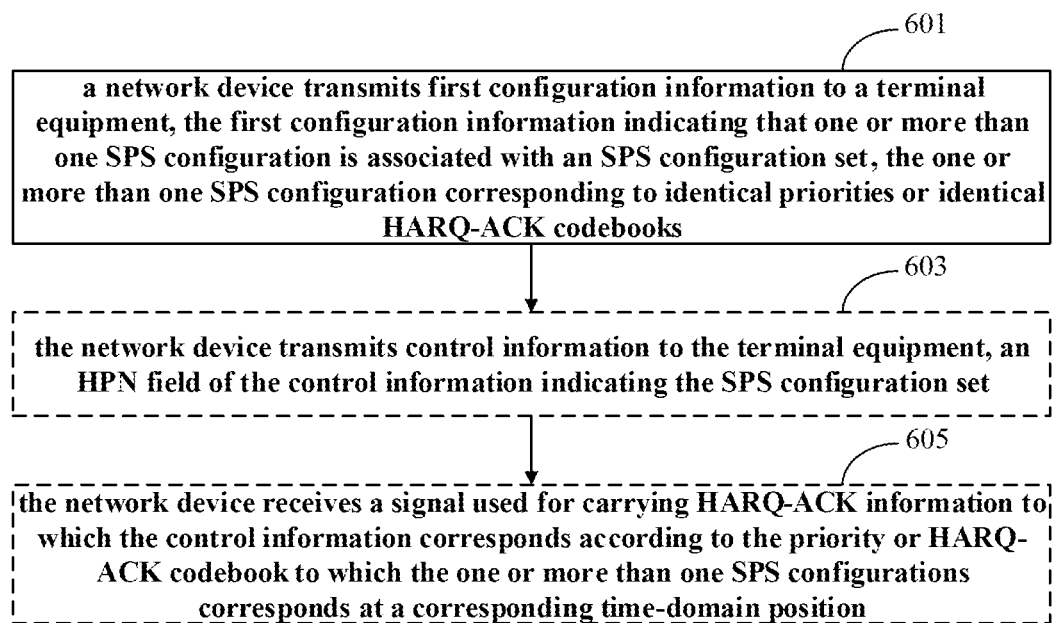

601 a network device transmits first configuration information to a terminal equipment, the first configuration information indicating that one or more than one SPS configuration is associated with an SPS configuration set, the one or more than one SPS configuration corresponding to identical priorities or identical HARQ-ACK codebooks

603 the network device transmits control information to the terminal equipment, an HPN field of the control information indicating the SPS configuration set

605 the network device receives a signal used for carrying HARQ-ACK information to which the control information corresponds according to the priority or HARQ-ACK codebook to which the one or more than one SPS configurations corresponds at a corresponding time-domain position

FIG. 6

700 wireless communication apparatus

701 receiving unit

702 transmitting unit

FIG. 7

800 wireless communication apparatus

801 receiving unit

802 determining unit

803 transmitting unit

FIG. 8

WIRELESS COMMUNICATION METHOD AND APPARATUS AND COMMUNICATION SYSTEM

CROSS-REFERENCE TO RELATED APPLICATION

This application is a continuation application of International Application PCT/CN2019/116418 filed on Nov. 7, 2019 and designated the U.S., the entire contents of which are incorporated herein by reference.

FIELD

This disclosure relates to the field of communications.

BACKGROUND

In order to meet the demands of the Industrial Internet of Things and enable simultaneous transmission of different types of services, an NR (New Radio) system will be further enhanced on the basis of Rel-15 (Release 15). In order to avoid interference between different services, a very important method is to indicate corresponding priorities to signals (or uplink resources), that is, the behaviors of a terminal equipment is determined according to priorities to which corresponding signals (or uplink resources) correspond when two signals (or uplink resources) collide.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that at present, there is no corresponding mechanism for determining a priority or HARQ-ACK codebook corresponding to HARQ-ACK information to which a joint SPS PDSCH release corresponds. The joint SPS PDSCH release refers to an SPS PDSCH release corresponding to a specific state; wherein the specific state is associated with one or more than one SPS configuration. This will cause a terminal equipment to be unable to determine a priority of the HARQ-ACK information, resulting in the UE is unable to handle collisions between the HARQ-ACK signal and other signals, that is, it is unable to perform prioritization/multiplexing handling with the other signals. Furthermore, this will also cause the terminal equipment is unable to transmit a signal used for carrying the HARQ-ACK information at a correct time-domain position, resulting in an inability of the system to work.

In order to solve the above problems or other similar problems, embodiments of this disclosure provide a wireless communication method and apparatus and a communication system, so as to improve reliability of the system.

According to a first aspect of the embodiments of this disclosure, there is provided a wireless communication method, the method including:

a terminal equipment receives first configuration information, the first configuration information indicating that one or more than one SPS configuration is associated with an SPS configuration set, the one or more than one SPS configuration corresponding to identical priorities or identical HARQ-ACK codebooks.

According to a second aspect of the embodiments of this disclosure, there is provided a wireless communication method, the method including:

a terminal equipment receives first configuration information and control information, the first configuration information indicating a list, the list being associated with one or more than one SPS configuration set, and the control information corresponding to one of the SPS configuration sets; and the terminal equipment determines a priority or an HARQ-ACK codebook of HARQ-ACK information to which the control information corresponds according to the SPS configuration set.

According to a third aspect of the embodiments of this disclosure, there is provided a wireless communication method, the method including:

a terminal equipment receives first configuration information and control information, the first configuration information indicating a list, the list being associated with one or more than one SPS configuration set, and the control information corresponding to one of the SPS configuration sets; and the terminal equipment determines a priority or an HARQ-ACK codebook of HARQ-ACK information to which the control information corresponds according to the control information.

According to a fourth aspect of the embodiments of this disclosure, there is provided a wireless communication method, the method including:

a network device transmits first configuration information to a terminal equipment, the first configuration information indicating that one or more than one SPS configuration is associated with an SPS configuration set, the one or more than one SPS configuration corresponding to identical priorities or identical HARQ-ACK codebooks.

According to a fifth aspect of the embodiments of this disclosure, there is provided a wireless communication apparatus, configured in a terminal equipment, the apparatus including:

a receiving unit configured to receive first configuration information, the first configuration information indicating that one or more than one SPS configuration is associated with an SPS configuration set, the one or more than one SPS configuration corresponding to identical priorities or identical HARQ-ACK codebooks.

According to a sixth aspect of the embodiments of this disclosure, there is provided a wireless communication apparatus, configured in a terminal equipment, the apparatus including:

a receiving unit configured to receive first configuration information and control information, the first configuration information indicating a list, the list being associated with one or more than one SPS configuration set, and the control information corresponding to one of the SPS configuration sets; and a determining unit configured to determine a priority or an HARQ-ACK codebook of HARQ-ACK information to which the control information corresponds according to the SPS configuration set.

According to a seventh aspect of the embodiments of this disclosure, there is provided a wireless communication apparatus, configured in a terminal equipment, the apparatus including:

a receiving unit configured to receive first configuration information and control information, the first configuration information indicating a list, the list being associated with one or more than one SPS configuration set, and the control information corresponding to one of the SPS configuration sets; and a determining unit configured to determine a priority or an HARQ-ACK codebook of HARQ-ACK information to which the control information corresponds according to the control information.

According to an eighth aspect of the embodiments of this disclosure, there is provided a wireless communication apparatus, configured in a network device, the apparatus including:

a transmitting unit configured to transmit first configuration information to a terminal equipment, the first configuration information indicating that one or more than one SPS configuration is associated with an SPS configuration set, the one or more than one SPS configuration corresponding to identical priorities or identical HARQ-ACK codebooks.

According to a ninth aspect of the embodiments of this disclosure, there is provided a terminal equipment, including the wireless communication apparatus as described in any one of the fifth to the seventh aspects.

According to a tenth aspect of the embodiments of this disclosure, there is provided a network device, including the wireless communication apparatus as described in the eighth aspect.

According to an eleventh aspect of the embodiments of this disclosure, there is provided a communication system, including the terminal equipment as described in the ninth aspect and/or the network device as described in the tenth aspect.

According to another aspect of the embodiments of this disclosure, there is provided a computer readable program, which, when executed in a terminal equipment, will cause a computer to carry out the method described in any one of the first to the third aspects in the terminal equipment.

According to a further aspect of the embodiments of this disclosure, there is provided a storage medium storing a computer readable program, which will cause a computer to carry out the method described in any one of the first to the third aspects in the terminal equipment.

According to still another aspect of the embodiments of this disclosure, there is provided a computer readable program, which, when executed in a network device, will cause a computer to carry out the method described in the fourth aspect in the network device.

According to yet another aspect of the embodiments of this disclosure, there is provided a storage medium storing a computer readable program, which will cause a computer to carry out the method described in the fourth aspect in a network device.

One of the advantages of the embodiments of this disclosure exists in that according to the embodiments of this disclosure, the priority or HARQ-ACK codebook to which the HARQ-ACK information corresponds may be determined. Hence, when the signal carrying the HARQ-ACK information is about to collide with another signal, the terminal equipment or the network device may, according to the priority or HARQ-ACK codebook to which the HARQ-ACK information corresponds, determine whether to multiplex the two signals or whether to transmit one of them and drop the other. And furthermore, after the priority or HARQ-ACK codebook to which the HARQ-ACK information corresponds is determined, the terminal equipment may be assisted in transmitting a signal used for carrying the HARQ-ACK information at a correct time-domain position.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the exemplify embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 1 is schematic diagram of semi-persistent scheduling;

FIG. 2 is another schematic diagram of the semi-persistent scheduling;

FIG. 3 is a schematic diagram of the wireless communication method of the first aspect of the embodiments of this disclosure;

FIG. 4 is a schematic diagram of the wireless communication method of the second aspect of the embodiments of this disclosure;

FIG. 5 is a schematic diagram of the wireless communication method of the third aspect of the embodiments of this disclosure;

FIG. 6 is a schematic diagram of the wireless communication method of the fourth aspect of the embodiments of this disclosure;

FIG. 7 is a schematic diagram of the wireless communication apparatus of the fifth aspect of the embodiments of this disclosure;

FIG. 8 is a schematic diagram of the wireless communication apparatus of the sixth aspect of the embodiments of this disclosure;

DETAILED DESCRIPTION

Figure 9:
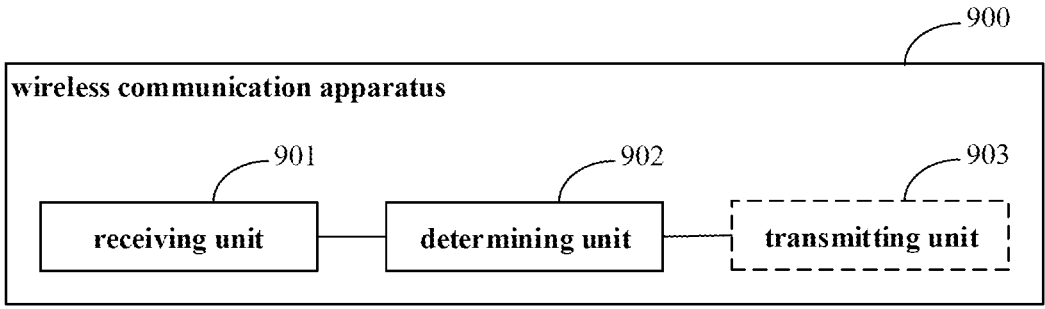
FIG. 9 is a schematic diagram of the wireless communication apparatus of the seventh aspect of the embodiments of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the scope of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not limited as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a user, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart phone, a smart watch, and a digital camera, etc.

For another example, in a scenario of the Internet of Things (IoT), etc., the terminal equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiment of this disclosure, regarding downlink semi-persistent scheduling (DL SPS), one DL SPS generally corresponds to one SPS configuration, and downlink semi-persistent scheduling activation control information (DL SPS activation PDCCH) refers to control information used for activating an SPS configuration set. For example, the SPS configuration set has a specific ID or has no specific ID, and the SPS configuration set includes one or more than one SPS configuration. Here, one SPS configuration activations therein is taken as an example. As shown in FIG. 1, when a UE receives the activation PDCCH (DCI), the DCI and a corresponding SPS configuration may provide information for receiving a corresponding PDSCH (physical downlink shared channel). As shown in FIG. 1, according to the information, the UE receives a first PDSCH after activation (at a slot n). Thereafter, the UE may determine a reception position of a second PDSCH according to a period in the SPS configuration (for example, the period is P), that is, a slot n+P, and receive subsequent PDSCHs by analogy.

As shown in FIG. 2, when the UE receives downlink semi-persistent scheduling release/deactivation control information (DL SPS release/deactivation PDCCH), the UE transmits corresponding HARQ-ACK feedback according to a time-domain position indicated by the control information (DCI). And at the same time, the UE stops receiving a PDSCH to which a corresponding SPS configuration corresponds, or clears corresponding DL assignment and releases corresponding configuration.

In the embodiment of this disclosure, regarding the Joint SPS PDSCH Release, in order to improve reliability of the control information and save overhead of indication signaling, the above DL SPS release/deactivation control information may not only release an SPS configuration (or release/deactivate semi-persistent transmission to which an SPS configuration corresponds), but also release an SPS configuration set (or release/deactivate semi-persistent transmission corresponding to an SPS configuration in the SPS configuration set). For example, RRC (radio resource control) signaling may configure a state list (such as SPS- ConfigDeactivationStateList), the state list including one or more states (SPS-ConfigDeactivationState) (that is, one or more SPS configuration sets), each state or SPS configuration set being mapped to one or more than one SPS configuration. After receiving the control information, the UE transmits corresponding HARQ-ACK information, and according to a state indicated by the DCI, stops receiving a PDSCH to which a corresponding SPS configuration corresponds, or clears corresponding DL assignment, and releases corresponding configurations.

In FIGS. 1 and 2 and corresponding description, a slot is taken as a time unit. However, this disclosure is not limited thereto, and a time unit involved in this disclosure may also be a symbol, a sub-slot, or a frame, or a sub-frame, etc.

In the following description of the embodiments of this disclosure, concepts of "correspond", "associate" and "indicate" may be interchangeable; for example, "correspond" may also be understood as "associate" or "indicate", and vice versa, which shall not be repeated herein any further.

In the following description of the embodiments of this disclosure, "priority" refers to a priority of a physical layer. In addition, the priority may also be understood as being used for physical layer prioritization/multiplexing handling (PHY prioritization/multiplexing handling).

Various implementations of the embodiments of this disclosure shall be described below with reference to the accompanying drawings. These implementations are illustrative only, and are not intended to limit this disclosure.

Embodiment of the First Aspect

The embodiment of the first aspect of this disclosure provides a wireless communication method, applicable to a terminal equipment. FIG. 3 is a schematic diagram of the wireless communication method of the embodiment of this disclosure. Referring to FIG. 3, the method includes:

operation 301: a terminal equipment receives first configuration information, the first configuration information indicating that one or more than one SPS configuration is associated with an SPS configuration set, the one or more than one SPS configuration corresponding to identical priorities or identical HARQ-ACK codebooks.

According to the method of the embodiment of this disclosure, all SPS configurations associated or mapped in an SPS configuration set correspond to identical priorities or HARQ-ACK codebooks. In this way, the identical priorities or HARQ-ACK codebooks may be regarded as priorities or HARQ-ACK codebooks corresponding to HARQ-ACK information to which control information (joint SPS PDSCH release) corresponds. With such restriction on the first configuration information, indication on the priority or HARQ-ACK codebook corresponding to the HARQ-ACK information may be achieved concisely, with no need of additional rules. In addition, the method may further help the terminal equipment to determine the time-domain position for transmitting the HARQ-ACK information, thereby improving reliability of the system.

In this embodiment of this disclosure, "the first configuration information indicating that one or more than one SPS configuration is associated with an SPS configuration set" refers to that the terminal equipment receives the first configuration information transmitted by the network device, such as RRC configuration information, the first configuration information being used to indicate that a state (e.g. SPS-ConfigDeactivationState) in a list (e.g. SPS-ConfigDeactivationStateList) is mapped or associated with one or more than one SPS configuration. The number of SPS configurations possibly mapped to or associated with each state is 1, 2, 3, . . . , 8. Furthermore, the number of states possibly included in the list may be 1, 2, 3, . . . , 16; or, the number of states possibly included in the list may be 1, 2, 3, . . . , $2^{N\_HPN}$; where, N_HPN refers to the length of an HPN field in DCI format 1_2, the length may be indicated by RRC signaling (e.g. HARQProcessNumberSize-ForDCI-Format1_2); however, this disclosure is not limited thereto.

In the embodiment of this disclosure, the first configuration information may act on a bandwidth part (BWP), that is, the first configuration information may indicate configuration information on a specific BWP (bandwidth part); however, this disclosure is not limited thereto.

In the embodiment of this disclosure, "state" and "SPS configuration set" are equivalent, unless otherwise specified. For the sake of illustration, "SPS configuration set" shall be described by taking "state" as an example.

In the embodiment of this disclosure, one or more than one SPS configuration corresponds to identical priorities, which may also be understood as that the terminal equipment expects that one or more than one SPS configuration corresponds to identical priorities, or the terminal equipment expects that the priorities to which one or more than one SPS configuration corresponds are identical.

For example, as described above, state #1 is associated with SPS configuration #1, SPS configuration #2 and SPS configuration #3, and the priorities to which SPS configuration #1, SPS configuration #2 and SPS configuration #3 correspond are identical.

Here, state #1 refers to a first element/value of a state list (e.g. SPS-ConfigDeactivationStateList); and SPS configuration #1 may refer to an SPS configuration (SPS-Config), and an index (SPS-ConfigIndex) to which it corresponds is 1. By analogy, state #n refers to an n-th element/value of a state list (such as SPS-ConfigDeactivationStateList); and SPS configuration #n may refer to an SPS configuration (SPS-Config), and an index (SPS-ConfigIndex) to which it corresponds is n. In the embodiments of the first aspect of this disclosure and the embodiments of other aspects of this disclosure, the described "states" and "SPS configurations" are all applicable to the above explanations, which shall not be repeated herein any further.

In one example, according to RRC signaling, SPS configuration #1 is associated with a high priority; at the same time, according to RRC signaling, SPS configuration #2 is also associated with a high priority; and at the same time, according to RRC signaling, SPS configuration #3 is also associated with a high priority. Thus, the three SPS configurations associated with state #1 correspond to identical priorities. Here, a value in the RRC signaling corresponding to the high priority is 1. And furthermore, this RRC signaling is used to indicate whether the SPS configuration is of a high priority or a low priority in PHY prioritization/multiplexing handling. For example, a HARQ codebook to which the HARQ-ACK information of the SPS PDSCH or the HARQ-ACK information of the SPS PDSCH release corresponds is determined.

Here, that the SPS configuration #n is associated with a high priority refers to that, a value of a priority to which an SPS configuration with an index value (SPS-ConfigIndex) of n corresponds is of high, or 0, or 1.

In another example, according to RRC signaling, SPS configuration #1 is associated with a low priority; at the same time, according to RRC signaling, SPS configuration #2 is also associated with a low priority; and at the same time, according to RRC signaling, SPS configuration #3 is also associated with a low priority. Thus, the three SPS configurations associated with state #1 correspond to identical priorities. Here, a value in the RRC signaling corresponding to the low priority is 0. And furthermore, this RRC signaling is used to indicate whether the SPS configuration is of a high priority or a low priority in PHY prioritization/multiplexing handling. For example, a HARQ codebook to which the HARQ-ACK information of the SPS PDSCH or the HARQ-ACK information of the SPS PDSCH release corresponds is determined.

Here, that the SPS configuration #n is associated with a low priority refers to that, a value of a priority value to which an SPS configuration with an index value (SPS-ConfigIndex) of n corresponds is of low, or 0, or 1.

Here, the value of the priority signaling to which the high priority corresponds may be of high, or 0, or 1. That is, if the value of the priority signaling to which the high priority corresponds is high, the value of the priority signaling to which the low priority corresponds is low; and if the value of the priority signaling to which the high priority corresponds is 0, the value of the priority signaling to which the low priority corresponds is 1; on the contrary, if the value of the priority signaling to which the high priority corresponds is 1, the value of the priority signaling to which the low priority corresponds is 0. In the embodiment of this disclosure, that the value of the priority signaling to which the high priority corresponds is 1 and the value of the priority signaling to which the low priority corresponds is 0 are taken as an example. In the embodiments of the first aspect of this disclosure and the embodiments of other aspects of this disclosure, the above explanations are applicable to "the SPS configuration is associated with a high priority" and "the SPS configuration is associated with a low priority", which shall not be repeated herein any further.

In the embodiment of this disclosure, similar to the case of priorities, that one or more than one SPS configuration corresponds to identical HARQ-ACK codebooks may also be understood that the terminal equipment expects that one or more than one SPS configuration corresponds to identical HARQ-ACK codebooks, or the terminal equipment expects that HARQ-ACK codebooks to which one or more than one SPS configuration corresponds are identical.

For example, as described above, state #1 is associated with SPS configuration #1, SPS configuration #2 and SPS configuration #3, hence, the HARQ-ACK codebooks to which SPS configuration #1, SPS configuration #2 and SPS configuration #3 correspond are identical.

In one example, according to RRC signaling, SPS configuration #1 is associated with a first HARQ-ACK codebook; at the same time, according to RRC signaling, SPS configuration #2 is also associated with the first HARQ-ACK codebook; and at the same time, according to RRC signaling, SPS configuration #3 is also associated with the first HARQ-ACK codebook. Thus, the three SPS configurations associated with state #1 correspond to identical HARQ-ACK codebooks.

Here, the first HARQ-ACK codebook may refer to an HARQ-ACK codebook with an index of 0, or an HARQ-ACK codebook with an index of 1, or an HARQ-ACK codebook with a priority of high, or an HARQ-ACK codebook with a priority of low.

In addition, that the SPS configuration #n is associated with the first HARQ-ACK codebook may also refer to that the SPS configuration #n is associated with a first PUCCH configuration (PUCCH-config). An index to which the first HARQ-ACK codebook corresponds is identical to an index to which the first PUCCH configuration corresponds.

In at least one embodiment, as shown in FIG. 3, the method may further include:

operation 303: the terminal equipment receives control information, an HPN field of the control information indicating the SPS configuration set.

In the embodiment of this disclosure, the above control information (i.e. downlink control information (DCI)) is used to release the SPS configuration, which may also be referred to as "SPS PDSCH release". When the terminal equipment receives an SPS PDSCH release, the terminal equipment may determine the SPS configuration set to which it corresponds according to the SPS PDSCH release. For example, the terminal equipment may determine the corresponding SPS configuration set according to a code-point of the HPN field.

For example, when the length of the HPN field is 4 bits, an HPN field '0000' represents the SPS configuration set #1; in addition, an HPN field '0001' represents the SPS configuration set #2, and so on, and an HPN field '1111' represents an SPS configuration set #16.

For another example, when the length of the HPN field is 2 bits, for example, when the length of an HPN field of a DCI format is configurable, such as DCI format 1_2, the length of the HPN field is determined to be 2 bits according to HARQProcessNumberSize-ForDCIFormat1_2, and the HPN field '00' represents SPS configuration set #1; in addition, HPN field '01' represents SPS configuration set #2, and so on, and HPN field '11' represents an SPS configuration set #4.

In the embodiment of this disclosure, assuming that the length of the HPN field is M, the total number of corresponding SPS configuration sets is at most $2^M$.

In the embodiment of this disclosure, the CRC of the above control information may be scrambled by a CS-RNTI, and a new indicator (a new data indicator) field of the control information may be 0.

In one example, all bits to which a modulation and coding scheme field of the control information corresponds are 1, and all bits to which a frequency-domain resource assignment field of the control information corresponds are 1, the control information includes a redundancy version (RV) field, all bits to which the RV domain corresponds being 0.

In another example, all bits to which the modulation and coding scheme field of the control information corresponds are 1, and all bits to which the frequency-domain resource assignment field of the control information corresponds are 1, and the control information includes no redundancy version (RV) field.

In the above two examples, the validation is achieved by the terminal equipment via the control information (the validation of the DCI format is achieved).

In the embodiment of this disclosure, if all the MCS field, the FDRA field and the RV field of the control information satisfy the settings in the first example, it may be said that the validation of the DCI format is achieved. Or, if all the MCS field, the FDRA field and the RV field of the control information satisfy the settings in the second example, it may be said that the validation of the DCI format is achieved. In the embodiment of this disclosure, if the validation is achieved, the terminal equipment deems that the information of the DCI format is valid SPS deactivation information. If the verification is not achieved, the terminal equipment drops all information in the DCI.

In the embodiments of this disclosure, in some embodiments, the terminal equipment may further receive second configuration information, the second configuration information being used to indicate the terminal equipment to generate at least two HARQ-ACK codebooks. In other words, the second configuration information is used to configure at least two HARQ-ACK codebooks that are simultaneously constructed.

For example, the second configuration information is a list (pdsch-HARQ-ACK-Codebook-Li st), which includes configuration information (pdsch-HARQ-ACK-Codebook) of two HARQ-ACK codebooks. Configuration information (pdsch-HARQ-ACK-Codebook) of each HARQ-ACK codebook is used to indicate whether the HARQ-ACK codebook is semi-static or dynamic.

Therefore, if the terminal equipment does not receive the second configuration information, it may not be necessary for the terminal equipment to distinguish priorities to which the HARQ-ACK information corresponds. After the terminal equipment receives the second configuration information, the terminal equipment needs to generate at least two (including two) HARQ-ACK codebooks of different priorities, hence, in this case, it is necessary for the terminal equipment to distinguish HARQ-ACK codebooks (of different priorities) to which the HARQ-ACK information corresponds. The addition of such a reception condition is helpful to the terminal equipment in distinguishing scenarios where identical priorities or identical HARQ-ACK codebooks are corresponded according to the one or more than one SPS configuration, so as to avoid erroneously determining the priorities or HARQ-ACK codebooks to which the HARQ-ACK information corresponds.

In the embodiment of this disclosure, as shown in FIG. 3, the method may further include:

operation 305: the terminal equipment transmits a signal used for carrying the HARQ-ACK information to which the control information corresponds at a corresponding time-domain position according to the priority or HARQ-ACK codebook to which the one or more than one SPS configuration corresponds.

In the embodiment of this disclosure, after the SPS configuration set to which the control information (SPS PDSCH release) corresponds is determined in operation 303, as the SPS configurations corresponding to the SPS configuration set correspond to identical priorities or HARQ-ACK codebooks, according to the indications of the priorities or the HARQ-ACK codebooks, the terminal equipment may determine a PUCCH configuration associated with the HARQ-ACK information to which the SPS PDSCH release corresponds, and then transmit a signal used for carrying the HARQ-ACK information to which the SPS PDSCH release corresponds according to corresponding configuration information.

For example, when the SPS PDSCH release corresponds to a low priority (for example, a signaling value to which RRC corresponds is 0, priority=0), its HARQ-ACK information corresponds to a PUCCH configuration with identical priority indices (such as PUCCH configuration #1, its associated priority index is 0).

For example, when the SPS PDSCH release corresponds to a high priority (for example, a signaling value to which RRC corresponds is 1, priority=1), its HARQ-ACK information corresponds to a PUCCH configuration with identical priority indices (such as PUCCH configuration #2, its associated priority index is 1).

For another example, when the SPS PDSCH release corresponds to HARQ-ACK codebook #0, its HARQ-ACK information corresponds to PUCCH configuration #1, wherein, a priority associated with HARQ-ACK codebook #0 is identical to a priority associated with PUCCH configuration #1 (with a priority index of 0).

For a further example, when the SPS PDSCH release corresponds to HARQ-ACK codebook #1, its HARQ-ACK information corresponds to PUCCH configuration #2, wherein, a priority associated with HARQ-ACK codebook #1 is identical to a priority associated with PUCCH configuration #2 (with a priority index of 1).

It should be noted here that HARQ-ACK codebook#0 and HARQ-ACK codebook#1 may be configured by RRC signaling (pdsch-HARQ-ACK-Codebook-List). The RRC signaling is used to indicate the terminal equipment to generate (simultaneously construct) one or two HARQ-ACK codebooks. In addition, the two HARQ-ACK codebooks may correspond respectively to different priorities. In this embodiment and other embodiments of this disclosure, both HARQ-ACK codebook #0 and HARQ-ACK codebook #1 are applicable to this explanation, which shall not be repeated herein any further.

In one embodiment, if the PUCCH configurations to which the above priorities or HARQ-ACK codebooks correspond do not include or are not configured with indications on the length of a sub-slot, the terminal equipment transmits the signal in units of slots.

For example, when the PUCCH configuration does not include or is not configured with Sub-slotLength-For-PUCCH, the terminal equipment transmits corresponding HARQ-ACK information in units of slots according to information indicated by a PDSCH-to-HARQ_feedback timing indicator field in the SPS PDSCH release.

For example, the terminal equipment receives the SPS PDSCH release in slot n, and transmits corresponding HARQ-ACK information in slot n+k according to a time-domain offset k indicated by a PDSCH-to-HARQ_feedback timing indicator field in the SPS PDSCH release.

In another embodiment, if the PUCCH configurations to which the above priorities or HARQ-ACK codebooks correspond include or are configured with indications on the length of a sub-slot, the terminal equipment transmits the signal in units of sub-slots. A symbol length to which the sub-slot corresponds may be at least 2 or 7.

For example, when the PUCCH configuration includes or is configured with Sub-slotLength-ForPUCCH, the terminal equipment transmits corresponding HARQ-ACK information in units of sub-slots according to information indicated by a PDSCH-to-HARQ_feedback timing indicator field in the SPS PDSCH release.

For example, with reference to sub-slots for PUCCH transmissions, the terminal equipment receives the SPS PDSCH release at sub-slot n, and transmits the corresponding HARQ-ACK information at sub-slot n+k according to a time-domain offset k indicated by a PDSCH-to-HARQ_feedback timing indicator field in the SPS PDSCH release.

According to the method of the embodiment of this disclosure, as described above, with the restriction on the first configuration information, indication on the HARQ-ACK information may be achieved concisely, with no need of additional rules. In addition, the method may further help the terminal equipment to determine the time-domain position for transmitting the HARQ-ACK information, thereby improving reliability of the system.

Embodiment of a Second Aspect

The embodiment of the second aspect of this disclosure provides a wireless communication method, applicable to a terminal equipment. This embodiment differs from the wireless communication method of the embodiment of the first aspect in that in the embodiment of this disclosure, the terminal equipment determines priorities or HARQ-ACK codebooks of HARQ-ACK information corresponding to or associated with control information (SPS PDSCH release) according to SPS configuration set.

FIG. 4 is a schematic diagram of the wireless communication method of the embodiments of this disclosure. As shown in FIG. 4, the method includes:

operation 401: a terminal equipment receives first configuration information and control information, the first configuration information indicating a list, the list being associated with one or more than one SPS configuration set, and the control information corresponding to one of the SPS configuration sets; and operation 403: the terminal equipment determines a priority or an HARQ-ACK codebook of HARQ-ACK information to which the control information corresponds according to the SPS configuration set to which the control information corresponds.

In the embodiment of this disclosure, the terminal equipment may determine the priority or the HARQ-ACK codebook of the HARQ-ACK information corresponding to or associated with the control information according to the SPS configuration set corresponding to the control information, thereby avoiding a problem of different understandings by the network device and the terminal equipment and enhancing the reliability of the system. In addition, the method may further help the terminal equipment to determine the time-domain position for transmitting the HARQ-ACK information, thereby improving the reliability of the system.

In the embodiment of this disclosure, in operation 401, for example, the terminal equipment receives first configuration information transmitted by the network device, such as RRC configuration information (SPS-ConfigDeactivationStateList), the first configuration information being used to indicate a list, the list being associated with one or more than one SPS configuration set. In one example, the list includes one or more than one state, and the number of the states possibly included in the list may be 1, 2, 3, . . . , 16, or, the number of the states possibly included in the list may be 1, 2, 3, . . . , $2^{N\_HPN}$; where, N_HPN refers to the length of an HPN field in DCI format 1_2, the length may be indicated by RRC signaling (e.g. HARQProcessNumberSize-ForDCI-Format1_2); however, this disclosure is not limited thereto.

In at least one embodiment, the SPS configuration set is associated with one or more than one SPS configuration, and a mapping relationship between the SPS configuration set and the one or more than one SPS configuration may be indicated by configuration information. The configuration information here is, for example, RRC signaling (SPS-ConfigDeactivationState), which may also be referred to as RRC configuration information. In addition, the number of SPS configurations to which the above SPS configuration set may be mapped or associated is 1, 2, 3, . . . , 8.

In the embodiment of this disclosure, the first configuration information may act on a bandwidth part (BWP), that is, the first configuration information may indicate configuration information on a specific BWP (bandwidth part); however, this disclosure is not limited thereto.

In the embodiment of this disclosure, "state" and "SPS configuration set" are equivalent, unless otherwise specified. For the sake of illustration, "SPS configuration set" shall be described by taking "state" as an example.

In the embodiment of this disclosure, the control information corresponds to an SPS configuration set, for example, an HPN field of the control information indicates the SPS configuration set. The control information (i.e. downlink control information (DCI)) is used to release the SPS configuration, which may also be referred to as "SPS PDSCH release". When the terminal equipment receives an SPS PDSCH release, the terminal equipment may determine the SPS configuration set to which it corresponds according to the SPS PDSCH release. For example, the terminal equipment may determine the corresponding SPS configuration set according to a codepoint of the HPN field.

For example, when the length of the HPN field is 4 bits, an HPN field '0000' represents the SPS configuration set #1; in addition, an HPN field '0001' represents the SPS configuration set #2, and so on, and an HPN field '1111' represents an SPS configuration set #16.

For another example, when the length of the HPN field is 2 bits, for example, when the length of an HPN field of a DCI format is configurable, such as DCI format 1_2, the HPN field '00' represents SPS configuration set #1; in addition, HPN field '01' represents SPS configuration set #2, and so on, and HPN field '11' represents an SPS configuration set #4.

In the embodiment of this disclosure, assuming that the length of the HPN field is M, the total number of corresponding SPS configuration sets is at most $2^M$.

In the embodiment of this disclosure, the CRC of the above control information may be scrambled by a CS-RNTI, and a new indicator (a new data indicator) field of the control information may be 0.

In one example, all bits to which a modulation and coding scheme field of the control information corresponds are 1, and all bits to which a frequency-domain resource assignment field of the control information corresponds are 1, the control information includes a redundancy version (RV) field, all bits to which the RV field corresponds being 0.

In another example, all bits to which the modulation and coding scheme field of the control information corresponds are 1, and all bits to which the frequency-domain resource assignment field of the control information corresponds are 1, and the control information includes no redundancy version (RV) field.

In the above two examples, the validation is achieved by the terminal equipment via the control information (the validation of the DCI format is achieved).

In the embodiment of this disclosure, if all the MCS field, the FDRA field and the RV field of the control information satisfy the settings in the first example, it may be said that validation of the DCI format is achieved. Or, if all the MCS field, the FDRA field and the RV field of the control information satisfy the settings in the second example, it may be said that validation of the DCI format is achieved. In the embodiment of this disclosure, if the validation is achieved, the terminal equipment deems that the information of the DCI format is valid SPS deactivation information. If the verification is not achieved, the terminal equipment drops all information in the DCI.

In at least one embodiment, in operation 403, the terminal equipment determines a priority of the HARQ-ACK information to which the control information corresponds according to the SPS configuration set, which may be that the terminal equipment determines the priority of the HARQ-ACK information to which the control information corresponds according to an SPS configuration in the SPS configuration set. Here, the SPS configuration in the SPS configuration set may be an activated/active SPS configuration in the SPS configuration set; however, this disclosure is not limited thereto.

For example, the priority of the HARQ-ACK information to which the control information corresponds may be a highest priority in priorities to which the SPS configuration in the SPS configuration set corresponds. Therefore, reliability of the HARQ-ACK information to which the SPS configuration set corresponds may be fully guaranteed, that is, the SPS configuration with the highest priority included in the SPS configuration set may be deactivated in a timely and reliable manner. And the following situation may also be avoided, that is, in the SPS configurations, there exists a high-priority SPS configuration, but corresponding deactivation signaling is of low priority, thereby resulting in that the reliability of the SPS configuration cannot be guaranteed.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. As the highest priority to which the four SPS configurations correspond is a high priority, the priority to which the SPS configuration set corresponds is a high priority. That is, the priority of the HARQ-ACK information to which the control information corresponds is a high priority.

For another example, the priority of the HARQ-ACK information to which the control information corresponds may be a highest priority in priorities to which the activated/active SPS configurations in the SPS configuration set correspond. Therefore, reliability of the HARQ-ACK information to which the SPS configuration set corresponds may be fully guaranteed; for example, the SPS configuration with the highest priority included in the SPS configuration set may be deactivated in a timely and reliable manner. And the following situation may also be avoided, that is, in the SPS configurations, there exists a high-priority SPS configuration, but corresponding deactivation signaling is of low priority, thereby resulting in that the reliability of the SPS configuration cannot be guaranteed. In addition, it is also taken into account in this example whether the SPS configurations in the SPS configuration set are activated. If the SPS configurations are not activated, their priorities do not need to be taken into account. In doing so, it may be avoided to determine the priority of the HARQ-ACK information by using a priority to which an inactive SPS configuration corresponds, so as to avoid erroneously judging the priority of the HARQ-ACK information and affecting the system performance.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. In the four associated SPS configurations, only SPS configuration #2 and SPS configuration #3 are activated (in an active/activated state). As the highest priority to which the two activated/active SPS configurations correspond is a low priority, the priority to which the SPS configuration set corresponds is a low priority, that is, the priority of the HARQ-ACK information to which the control information corresponds is a low priority.

Here, in the RRC signaling, a value corresponding to the high priority is 1, and a value corresponding to the low priority is 0. In addition, this RRC signaling is used to indicate whether the SPS configuration is high priority or low priority in PHY prioritization/multiplexing handling. For example, a HARQ-ACK codebook to which the HARQ-ACK information of the SPS PDSCH or the HARQ-ACK information of the SPS PDSCH release corresponds is determined.

For another example, the priority of the HARQ-ACK information to which the control information corresponds may be a lowest priority in priorities to which the SPS configurations in the SPS configuration set correspond. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. As corresponding lowest priority in the four SPS configurations is a low priority, the priority to which the SPS configuration set corresponds is a low priority.

For another example, the priority of the HARQ-ACK information to which the control information corresponds may be a lowest priority in priorities to which the activated/active SPS configurations in the SPS configuration set correspond. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority. In addition, it is also taken into account in this example whether the SPS configurations in the SPS configuration set are activated. If the SPS configurations are not activated, their priorities do not need to be taken into account. In doing so, it may be avoided to determine the priority of the HARQ-ACK information by using a priority to which an inactive SPS configuration corresponds, so as to avoid erroneously judging the priority of the HARQ-ACK information and affecting the system performance.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. In the four associated SPS configurations, only SPS configuration #2 and SPS configuration #3 are activated (in an active/activated state). As the lowest priority to which the two activated/active SPS configurations correspond is a low priority, the priority to which the SPS configuration set corresponds is a low priority, that is, the priority of the HARQ-ACK information to which the control information corresponds is a low priority.

Here, in the RRC signaling, a value corresponding to the high priority is 1, and a value corresponding to the low priority is 0. In addition, this RRC signaling is used to indicate whether the SPS configuration is high priority or low priority in PHY prioritization/multiplexing handling. For example, a HARQ-ACK codebook to which the HARQ-ACK information of the SPS PDSCH or the HARQ-ACK information of the SPS PDSCH release corresponds is determined.

For another example, the priority of the HARQ-ACK information to which the control information corresponds may be a priority to which an SPS configuration with a lowest SPS configuration index in the SPS configuration set corresponds. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority. Furthermore, according to the embodiment of this disclosure, if the SPS configuration with a lowest index is indicated as being of a high priority, HARQ-ACK information to which it corresponds may also be enabled to have a high priority, thereby ensuring the reliability. In this way, the network device may transmit relatively important data information by using an SPS configuration with a relatively low SPS configuration index, thereby improving convenience of the system.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. As an SPS configuration index to which SPS configuration #1 in the four SPS configurations is lowest, and a priority to which SPS configuration #1 corresponds is a high priority, the priority to which the SPS configuration set corresponds is a high priority.

For another example, the priority of the HARQ-ACK information to which the control information corresponds may be a priority to which an SPS configuration with a lowest index among the activated/active SPS configurations in the SPS configuration set corresponds. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the UE is unable to determine which SPS configuration in the SPS configuration set is used to determine the priority. Furthermore, if the SPS configuration with a lowest index is indicated as being of a high priority, HARQ-ACK information to which it corresponds may be enabled to have a high priority, thereby ensuring the reliability. In this way, the network device may transmit relatively important data information by using an SPS configuration with a relatively low SPS index, thereby improving convenience of the system. In addition, it is also taken into account in this example whether the SPS configurations in the SPS configuration set are activated. If the SPS configurations are not activated, their priorities do not need to be taken into account. In doing so, it may be avoided to determine the priority of the HARQ-ACK information by using a priority to which an inactive SPS configuration corresponds, so as to avoid erroneously judging the priority of the HARQ-ACK information and affecting the system performance.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority, wherein, only SPS configuration #2 and SPS configuration #3 in the four associated SPS configurations are activated (in an active/activated state). As an SPS configuration index to which SPS configuration #2 in the two activated/active SPS configurations corresponds is lowest and a priority to which SPS configuration #2 corresponds is a low priority, the priority to which the SPS configuration set corresponds is a low priority, that is, the priority of the HARQ-ACK information to which the control information corresponds is a low priority.

Here, in the RRC signaling, the value corresponding to the high priority is 1, and the value corresponding to the low priority is 0. In addition, this RRC signaling is used to indicate whether the SPS configuration is high priority or low priority in PHY prioritization/multiplexing handling. For example, the HARQ-ACK codebook corresponding to the HARQ-ACK information of the SPS PDSCH or the HARQ-ACK information of the SPS PDSCH release is determined.

For another example, the priority of the HARQ-ACK information to which the control information corresponds may be a priority to which an SPS configuration with a highest SPS configuration index in the SPS configuration set corresponds. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority. Furthermore, if the SPS configuration with a highest index is indicated as being of a high priority, HARQ-ACK information to which it corresponds may be enabled to have a high priority, thereby ensuring the reliability. In this way, the network device may transmit relatively important data information by using an SPS configuration with a relatively high SPS index, thereby improving convenience of the system.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. As an SPS configuration index to which SPS configuration #4 in the four SPS configurations corresponds is highest and a priority to which SPS configuration #4 corresponds is a high priority, the priority to which the SPS configuration set corresponds is a high priority.

For another example, the priority of the HARQ-ACK information to which the control information corresponds may be a priority to which an SPS configuration with a highest index in the active SPS configurations in the SPS configuration set corresponds. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority. Furthermore, if the SPS configuration with a highest index is indicated as being of a high priority, HARQ-ACK information to which it corresponds may be enabled to have a high priority, thereby ensuring the reliability. In this way, the network device may transmit relatively important data information by using an SPS configuration with a relatively high SPS configuration index, thereby improving convenience of the system. In addition, it is also taken into account in this example whether each SPS configuration in the SPS configuration set are activated. If the SPS configurations are not activated, their priorities do not need to be taken into account. In doing so, it may be avoided to determine the priority of the HARQ-ACK information by using a priority to which an inactive SPS configuration corresponds, so as to avoid erroneously judging the priority of the HARQ-ACK information and affecting the system performance.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority, wherein, only SPS configuration #2 and SPS configuration #3 in the four associated SPS configurations are activated (in an active/activated state). As an SPS configuration index to which SPS configuration #3 in the two activated/active SPS configurations corresponds is highest and a priority to which SPS configuration #3 corresponds is a low priority, the priority to which the SPS configuration set corresponds is a low priority, that is, the priority of the HARQ-ACK information to which the control information corresponds is a low priority.

Here, in the RRC signaling, the value corresponding to the high priority is 1, and the value corresponding to the low priority is 0. In addition, this RRC signaling is used to indicate whether the SPS configuration is high priority or low priority in PHY prioritization/multiplexing handling. For example, the HARQ-ACK codebook corresponding to the HARQ-ACK information of the SPS PDSCH or the HARQ-ACK information of the SPS PDSCH release is determined.

For another example, the priority of the HARQ-ACK information to which the control information corresponds may be a priority to which a recently activated SPS configuration in the SPS configuration set corresponds. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority. Furthermore, as timeliness to which a recent DCI indication corresponds is best, a priority of the recently activated SPS configuration is taken as a priority of SPS PDSCH release to which it corresponds, which may more correctly reflect the priority of the SPS PDSCH release, and improve the performance of the system.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority. And furthermore, slots where active DCI to which SPS configuration #1, SPS configuration #2, SPS configuration #3 and SPS configuration #4 correspond is located are $N_1$, $N_2$, $N_3$ and $N_4$, respectively. Here, $N_3$ is a latest one in the four time units, and a priority of SPS configuration #3 to which $N_3$ corresponds (a low priority) is the priority to which the SPS configuration set corresponds, that is, the priority of the HARQ-ACK information to which the control information corresponds is a low priority.

In addition, if more than one time unit in $N_1$, $N_2$, $N_3$ and $N_4$ is latest time unit, for example, both $N_3$ and $N_4$ are the latest ones in the four time units, in this case, a priority corresponding to a corresponding SPS configuration with a lowest SPS configuration index (SPS configuration #3) or a corresponding SPS configuration with a highest SPS configuration index (SPS configuration #4) is the priority of the HARQ-ACK of the control information. Therefore, the terminal equipment may uniquely determine an SPS configuration when active DCIs to which more than one SPS configuration in an SPS configuration set correspond are in identical slots. The priority of the HARQ-ACK information to which the control information corresponds is the priority to which the SPS configuration corresponds.

For another example, the priority of the HARQ-ACK information to which the control information corresponds may be a priority to which an active SPS configuration recently activated in the SPS configuration set corresponds. In this way, the terminal equipment may be enabled to uniquely determine the priority of the HARQ-ACK information to which the SPS configuration set corresponds, thereby avoiding ambiguity of indication of the priority of the HARQ-ACK information and affecting the system performance due to that the terminal equipment is unable to determine which SPS configuration in the SPS configuration set is used to determine the priority. Furthermore, as timeliness to which a recent DCI indication corresponds is best, a priority of the recently activated active SPS configuration is taken as a priority of SPS PDSCH release to which it corresponds, which may more correctly reflect the priority of the SPS PDSCH release, and improve the performance of the system. Moreover, it is also taken into account in this example whether the SPS configurations in the SPS configuration set are activated. If the SPS configurations are not activated, their priorities do not need to be used for determining the priority of the HARQ-ACK information. In doing so, it may be avoided to determine the priority of the HARQ-ACK information by using a priority to which an inactive SPS configuration corresponds, so as to avoid erroneously judging the priority of the HARQ-ACK information and affecting the system performance.

An example is as follows:

assuming that the SPS configuration set is associated with SPS configuration #1, SPS configuration #2, SPS configuration #3 and SPS configuration #4. According to RRC signaling, SPS configuration #1 is associated with a high priority; at the same time, according to RRC signaling, SPS configuration #2 is associated with a low priority; at the same time, according to RRC signaling, SPS configuration #3 is associated with a low priority; and according to RRC signaling, SPS configuration #4 is associated with a high priority, wherein, only SPS configuration #1, SPS configuration #2 and SPS configuration #3 in the four associated SPS configurations are activated (in an active/activated state). And furthermore, slots where active DCIs to which active SPS configurations (SPS configuration #1, SPS configuration #2 and SPS configuration #3) correspond are located are $N_1$, $N_2$ and $N_3$, respectively. Here, $N_3$ is a latest one in the three time units, and a priority of SPS configuration #3 to which $N_3$ corresponds (a low priority) is the priority to which the SPS configuration set corresponds, that is, the priority of the HARQ-ACK information to which the control information corresponds is a low priority.

In addition, if more than one time unit in the above $N_1$, $N_2$ and $N_3$ is latest time unit, for example, both $N_2$ and $N_3$ are the latest ones in the three time units, in this case, a priority corresponding to a corresponding SPS configuration with a lowest SPS configuration index (SPS configuration #2) or a corresponding SPS configuration with a highest SPS configuration index (SPS configuration #3) is the priority of the HARQ-ACK of the control information. Therefore, the terminal equipment may uniquely determine an SPS configuration when active DCI to which more than one SPS configuration in an SPS configuration set corresponds is in identical slots. The priority of the HARQ-ACK information to which the control information corresponds is the priority to which the SPS configuration corresponds.

In the embodiment of this disclosure, for the above "active SPS configuration", it may be a first SPS configuration; for example, the terminal equipment receives an SPS PDSCH in a first slot according to information on the first SPS configuration, and the SPS PDSCH reception is activated in the first slot. It may also be described as "if SPS PDSCH reception is activated for a UE and the UE is configured to receive SPS PDSCH according to the first SPS configuration in the first slot". Here, the first slot refers to a recent slot earlier than or not later than a slot where the control information is located and used for receiving the SPS PDSCH to which the first SPS configuration corresponds.

In the embodiment of this disclosure, as described above, "the recently activated SPS configuration may be a recently activated SPS configuration in the activated/active SPS configurations in the SPS configuration set", for example, according to the first SPS configuration, the terminal equipment determines to receive the PDSCH at such time-domain positions as slot n−2*P, slot n−P, slot n, slot n+P, and slot n+2*P, etc.; where, P refers to the period of the SPS. If a slot where the deactivation control information is located is n+1, at least slot n−2*P, slot n−P and slot n are earlier or no later than the slot where the deactivation control information is located (slot n+1). And in slot n−2*P, slot n−P and slot n, slot n is most close to slot n+1, therefore, in this scenario, slot n is the above first slot.

In at least one embodiment, in operation 403, that the terminal equipment determines an HARQ-ACK codebook of HARQ-ACK information to which the control information corresponds according to the SPS configuration set may be that the terminal equipment determines an HARQ-ACK codebook of HARQ-ACK information to which the control information corresponds according to an HARQ-ACK codebook to which an SPS configuration in the SPS configuration set corresponds. Here, the SPS in the SPS configuration set may be an activated/active SPS configuration in the SPS configuration set; however, this disclosure is not limited thereto.

For example, the HARQ-ACK codebook of the HARQ-ACK information to which the control information corresponds may be an HARQ-ACK codebook with a highest priority or a highest priority index to which the SPS configuration in the SPS configuration set corresponds. Therefore, reliability of the HARQ-ACK information to which the SPS configuration set corresponds may be fully guaranteed, that is, the SPS configuration corresponding to the HARQ-ACK codebook with a highest priority or a highest priority index included in the SPS configuration set may be deactivated in a timely and reliable manner. And the following situation may also be avoided, that is, in the SPS configurations, there exists an SPS configuration corresponding to a high-priority HARQ-ACK codebook, but corresponding deactivation signaling is for an SPS configuration corresponding to a low-priority HARQ-ACK codebook, thereby resulting in that the reliability of the SPS configuration corresponding to the HARQ-ACK codebook with a highest priority or a highest priority index cannot be guaranteed.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. In addition, for example, a priority associated with HARQ-ACK codebook #0 is a low priority (with a priority index of 0), and a priority associated with HARQ-ACK codebook #1 is a high priority (with a priority index of 1). As a corresponding HARQ-ACK codebook with a highest priority (or priority index) in the four SPS configurations is HARQ-ACK codebook#1, an HARQ-ACK codebook to which the SPS configuration set corresponds is HARQ-ACK codebook #1, that is, the HARQ-ACK codebook of the HARQ-ACK information to which the control information corresponds is the HARQ-ACK codebook with the highest priority (or priority index).

For another example, the HARQ-ACK codebook of the HARQ-ACK information to which the control information corresponds may be an HARQ-ACK codebook with a highest priority or priority index to which an activated/active SPS configuration in the SPS configuration set corresponds.

Therefore, reliability of the HARQ-ACK information to which the SPS configuration set corresponds may be fully guaranteed; for example, the SPS configuration corresponding to the HARQ-ACK codebook with a highest priority or a highest priority index included in the SPS configuration set may be deactivated in a timely and reliable manner. And the following situation may also be avoided, that is, in the SPS configurations, there exists an SPS configuration corresponding to a high-priority HARQ-ACK codebook, but corresponding deactivation signaling is for an SPS configuration corresponding to a low-priority HARQ-ACK codebook, thereby resulting in that the reliability of the SPS configuration corresponding to the high-priority HARQ-ACK codebook cannot be guaranteed. Moreover, it is also taken into account in this example whether the SPS configurations in the SPS configuration set are activated. If the SPS configurations are not activated, its HARQ-ACK codebook does not need to be taken into account. In doing so, it may be avoided to determine the HARQ-ACK codebook of the HARQ-ACK information by using an HARQ-ACK codebook to which an inactive SPS configuration corresponds, so as to avoid erroneously judging the priority of the HARQ-ACK information and affecting the system performance.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. In addition, for example, a priority associated with HARQ-ACK codebook #0 is a low priority (with a priority index of 0), and a priority associated with HARQ-ACK codebook #1 is a high priority (with a priority index of 1). In the above four associated SPS configurations, only SPS configuration #2 and SPS configuration #3 are activated (in an active/activated state). As a corresponding HARQ-ACK codebook with a highest corresponding priority (or priority index) in the two activated/active SPS configurations is HARQ-ACK codebook#0, an HARQ-ACK codebook to which the SPS configuration set corresponds is HARQ-ACK codebook #0, that is, the HARQ-ACK codebook of the HARQ-ACK information to which the control information corresponds is HARQ-ACK codebook #0.

Here, the RRC signaling may indicate an index or a corresponding priority index (such as 0 or 1) of an HARQ-ACK codebook. In addition, this RRC signaling is used to indicate whether the SPS configuration is high priority or low priority in PHY prioritization/multiplexing handling. For example, the HARQ-ACK codebook to which the HARQ-ACK information of the SPS PDSCH or the HARQ-ACK information of the SPS PDSCH release corresponds is determined.

For another example, the HARQ-ACK codebook of the HARQ-ACK information to which the control information corresponds may be an HARQ-ACK codebook with a lowest priority or priority index to which an SPS configuration in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. In addition, for example, a priority associated with HARQ-ACK codebook #0 is a low priority (with a priority index of 0), and a priority associated with HARQ-ACK codebook #1 is a high priority (with a priority index of 1). As a corresponding HARQ-ACK codebook with a lowest priority (or priority index) in the four SPS configurations is HARQ-ACK codebook#0, an HARQ-ACK codebook to which the SPS configuration set corresponds is HARQ-ACK codebook #0.

For another example, the HARQ-ACK codebook of the HARQ-ACK information to which the control information corresponds may be an HARQ-ACK codebook with a lowest priority or priority index to which an activated/active SPS configuration in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Moreover, it is also taken into account in this example whether the SPS configurations in the SPS configuration set are activated. If the SPS configurations are not activated, their HARQ-ACK codebooks do not need to be taken into account. In doing so, it may be avoided to determine the HARQ-ACK codebook of the HARQ-ACK information by using an HARQ-ACK codebook to which an inactive SPS configuration corresponds, so as to avoid erroneously judging the HARQ-ACK codebook of the HARQ-ACK information and affecting the system performance.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. In addition, for example, a priority associated with HARQ-ACK codebook #0 is a low priority (with a priority index of 0), and a priority associated with HARQ-ACK codebook #1 is a high priority (with a priority index of 1). In the above four associated SPS configurations, only SPS configuration #2 and SPS configuration #3 are activated (in an active/activated state). As a corresponding HARQ-ACK codebook with a lowest priority or priority index in the two activated/ active SPS configurations is HARQ-ACK codebook#0, an HARQ-ACK codebook to which the SPS configuration set corresponds is HARQ-ACK codebook #0, that is, the HARQ-ACK codebook of the HARQ-ACK information to which the control information corresponds is HARQ-ACK codebook #0.

Here, the RRC signaling may indicate an index or a corresponding priority index (such as 0 or 1) of an HARQ-ACK codebook. In addition, this RRC signaling is used to indicate whether the SPS configuration is high priority or low priority in PHY prioritization/multiplexing handling. For example, the HARQ-ACK codebook to which the HARQ-ACK information of the SPS PDSCH or the HARQ-ACK information of the SPS PDSCH release corresponds is determined.

For another example, the HARQ-ACK codebook of the HARQ-ACK information to which the control information corresponds may be an HARQ-ACK codebook to which an SPS configuration with a lowest SPS configuration index in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Furthermore, according to the embodiment of this disclosure, if the HARQ-ACK codebook to which the SPS configuration with a lowest index corresponds is indicated as the HARQ-ACK codebook of the HARQ-ACK information, the network device may transmit relatively important data information by using an SPS configuration with a relatively low SPS index, thereby improving convenience of the system.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. As an SPS configuration index to which SPS configuration #1 in the four SPS configurations corresponds is lowest, and an HARQ-ACK codebook to which SPS configuration #1 corresponds is HARQ-ACK codebook #1, the HARQ-ACK codebook to which the SPS configuration set corresponds is HARQ-ACK codebook #1.

For another example, the HARQ-ACK codebook of the HARQ-ACK information to which the control information corresponds may be an HARQ-ACK codebook to which an SPS configuration with a lowest index in active SPS configurations in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Furthermore, if the HARQ-ACK codebook corresponding to the SPS configuration with a lowest index is indicated as the HARQ-ACK codebook of the HARQ-ACK information, the network device may transmit relatively important data information by using an SPS configuration with a relatively low SPS index, thereby improving convenience of the system. Moreover, it is also taken into account in this example whether the SPS configurations in the SPS configuration set are activated. If the SPS configurations are not activated, their HARQ-ACK codebooks do not need to be taken into account. In doing so, it may be avoided to determine the HARQ-ACK codebook of the HARQ-ACK information by using an HARQ-ACK codebook to which an inactive SPS configuration corresponds, so as to avoid erroneously judging the HARQ-ACK codebook of the HARQ-ACK information and affecting the system performance.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1, wherein, in the four associated SPS configurations, only SPS configuration #2 and SPS configuration #3 are activated (in an active/activated state). As an SPS configuration index to which SPS configuration #2 in the two active SPS configurations corresponds is lowest and the HARQ-ACK codebook to which SPS configuration #2 corresponds is HARQ-ACK codebook #0, the HARQ-ACK codebook to which the SPS configuration set corresponds is HARQ-ACK codebook #0, that is, the HARQ-ACK codebook of the HARQ-ACK information to which the control information corresponds is HARQ-ACK codebook #0.

Here, the RRC signaling may indicate an index (such as 0 or 1) of an HARQ-ACK codebook. In addition, this RRC signaling is used to indicate whether the SPS configuration is high priority or low priority in PHY prioritization/multiplexing handling. For example, the HARQ-ACK codebook to which the HARQ-ACK information of the SPS PDSCH or the HARQ-ACK information of the SPS PDSCH release corresponds is determined.

For another example, the HARQ-ACK codebook of the HARQ-ACK information to which the control information corresponds may be an HARQ-ACK codebook to which an SPS configuration with a highest index in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Furthermore, if the HARQ-ACK codebook corresponding to the SPS configuration with a highest index is indicated as the HARQ-ACK codebook of the HARQ-ACK information, the network device may transmit relatively important data information by using an SPS configuration with a relatively high SPS index, thereby improving convenience of the system.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. As an SPS configuration index to which SPS configuration #4 in the four SPS configurations corresponds is highest and the HARQ-ACK codebook to which SPS configuration #4 corresponds is HARQ-ACK codebook #1, the HARQ-ACK codebook to which the SPS configuration set corresponds is HARQ-ACK codebook #1.

For another example, the HARQ-ACK codebook of the HARQ-ACK information to which the control information corresponds may be an HARQ-ACK codebook to which an SPS configuration with a highest index in active SPS configurations in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Furthermore, if the HARQ-ACK codebook corresponding to the SPS configuration with a highest index is indicated as the HARQ-ACK codebook of the HARQ-ACK information, the network device may transmit relatively important data information by using an SPS configuration with a relatively high SPS index, thereby improving convenience of the system. Moreover, it is also taken into account in this example whether the SPS configurations in the SPS configuration set are activated. If the SPS configurations are not activated, their HARQ-ACK codebooks do not need to be taken into account. In doing so, it may be avoided to determine the HARQ-ACK codebook of the HARQ-ACK information by using an HARQ-ACK codebook to which an inactive SPS configuration corresponds, so as to avoid erroneously judging the HARQ-ACK codebook of the HARQ-ACK information and affecting the system performance.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1, wherein, in the four associated SPS configurations, only SPS configuration #2 and SPS configuration #3 are activated (in an active/activated state). As an SPS configuration index to which SPS configuration #3 in the two active SPS configurations corresponds is highest and the HARQ-ACK codebook to which SPS configuration #3 corresponds is HARQ-ACK codebook #0, the HARQ-ACK codebook to which the SPS configuration set corresponds is HARQ-ACK codebook #0, that is, the HARQ-ACK codebook of the HARQ-ACK information to which the control information corresponds is HARQ-ACK codebook #0.

Here, the RRC signaling may indicate an index (such as 0 or 1) of an HARQ-ACK codebook. In addition, this RRC signaling is used to indicate whether the SPS configuration is high priority or low priority in PHY prioritization/multiplexing handling. For example, the HARQ-ACK codebook to which the HARQ-ACK information of the SPS PDSCH or the HARQ-ACK information of the SPS PDSCH release corresponds is determined.

For another example, the HARQ-ACK codebook of the HARQ-ACK information to which the control information corresponds may be an HARQ-ACK codebook to which a recently activated SPS configuration in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Furthermore, as timeliness to which a recent DCI indication corresponds is best, an HARQ-ACK codebook of the recently activated SPS configuration is taken as an HARQ-ACK codebook of SPS PDSCH release to which it corresponds, which may more correctly reflect the HARQ-ACK codebook of the SPS PDSCH release, and improve the performance of the system.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1. And furthermore, slots where active DCI to which SPS configuration #1, SPS configuration #2, SPS configuration #3 and SPS configuration #4 correspond is located are $N_1$, $N_2$, $N_3$ and $N_4$, respectively. Here, $N_3$ is a latest one in the four time units, and an HARQ-ACK codebook (HARQ-ACK codebook #0) of SPS configuration #3 to which $N_3$ corresponds is the HARQ-ACK codebook to which the SPS configuration set corresponds, that is, the HARQ-ACK codebook of the HARQ-ACK information to which the control information corresponds is HARQ-ACK codebook #0.

In addition, if more than one time unit in $N_1$, $N_2$, $N_3$ and $N_4$ is latest time unit, for example, both $N_3$ and $N_4$ are the latest ones in the four time units, in this case, an HARQ-ACK codebook of a corresponding SPS configuration with a lowest SPS configuration index (SPS configuration #3) or a corresponding SPS configuration with a highest SPS configuration index (SPS configuration #4) is the HARQ-ACK codebook of the HARQ-ACK of the control information. Therefore, the terminal equipment may uniquely determine an SPS configuration when active DCI to which more than one SPS configuration in an SPS configuration set corresponds is in identical slots. The HARQ-ACK codebook of the HARQ-ACK information to which the control information corresponds is the HARQ-ACK codebook to which the SPS configuration corresponds.

For another example, the HARQ-ACK codebook of the HARQ-ACK information to which the control information corresponds may be an HARQ-ACK codebook to which an activated/active SPS configuration recently activated in the SPS configuration set corresponds. Therefore, the terminal equipment may be enabled to uniquely determine the HARQ-ACK codebook of the HARQ-ACK information corresponding to the SPS configuration set, thereby avoiding ambiguity of indication of the HARQ-ACK codebook of the HARQ-ACK information and affecting the system performance due to that the terminal equipment is unable to determine which SPS configuration in the SPS configuration set is used to determine the HARQ-ACK codebook. Furthermore, as timeliness to which a recent DCI indication corresponds is best, an HARQ-ACK codebook of the activated/active SPS configuration recently activated is taken as an HARQ-ACK codebook of SPS PDSCH release to which it corresponds, which may more correctly reflect the HARQ-ACK codebook of the SPS PDSCH release, and improve the performance of the system. Moreover, it is also taken into account in this example whether the SPS configurations in the SPS configuration set are activated. If the SPS configurations are not activated, their HARQ-ACK codebooks do not need to be taken into account for determining the HARQ-ACK codebook of the HARQ-ACK information. In doing so, it may be avoided to determine the HARQ-ACK codebook of the HARQ-ACK information by using an HARQ-ACK codebook to which an inactive SPS configuration corresponds, so as to avoid erroneously judging the HARQ-ACK codebook of the HARQ-ACK information and affecting the system performance.

An example is as follows:

assuming that the SPS configuration set is associated with SPS configuration #1, SPS configuration #2, SPS configuration #3, SPS configuration #4. According to RRC signaling, SPS configuration #1 is associated with HARQ-ACK codebook #1; at the same time, according to RRC signaling, SPS configuration #2 is associated with HARQ-ACK codebook #0; at the same time, according to RRC signaling, SPS configuration #3 is associated with HARQ-ACK codebook #0; and according to RRC signaling, SPS configuration #4 is associated with HARQ-ACK codebook #1, wherein, only SPS configuration #1, SPS configuration #2 and SPS configuration #3 in the four associated SPS configurations are activated (in an active/activated state). And furthermore, slots where active DCI to which active SPS configurations (SPS configuration #1, SPS configuration #2 and SPS configuration #3) correspond is located is $N_1$, $N_2$ and $N_3$, respectively. Here, $N_3$ is a latest one in the three time units, and an HARQ-ACK codebook of SPS configuration #3 to which $N_3$ corresponds (HARQ-ACK codebook #0) is the HARQ-ACK codebook to which the SPS configuration set corresponds, that is, the HARQ-ACK codebook of the HARQ-ACK information to which the control information corresponds is HARQ-ACK codebook #0.

In addition, if more than one time unit in $N_1$, $N_2$ and $N_3$ is latest time unit, for example, both $N_2$ and $N_3$ are the latest ones in the three time units, in this case, an HARQ-ACK codebook corresponding to a corresponding SPS configuration with a lowest SPS configuration index (SPS configuration #2) or a corresponding SPS configuration with a highest SPS configuration index (SPS configuration #3) is the HARQ-ACK codebook of the HARQ-ACK of the control information. Therefore, the terminal equipment may uniquely determine an SPS configuration when active DCI to which more than one SPS configuration in an SPS configuration set corresponds is in identical slots. The HARQ-ACK codebook of the HARQ-ACK information to which the control information corresponds is the HARQ-ACK codebook to which the SPS configuration corresponds.

In the embodiment of this disclosure, the above "activated/active SPS configuration" may be a first SPS configuration; for example, the terminal equipment receives an SPS PDSCH in a first slot according to information on the first SPS configuration, and the SPS PDSCH reception is activated in the first slot. It may also be described as "if SPS PDSCH reception is activated for a UE and the UE is configured to receive SPS PDSCH according to the first SPS configuration in the first slot". Here, the first slot refers to a recent slot earlier than or not later than a slot where the control information is located and used for receiving the SPS PDSCH to which the first SPS configuration corresponds.

In the embodiment of this disclosure, as described above, "the recently activated SPS configuration may be a recently activated SPS configuration in the activated/active SPS configurations in the SPS configuration set", for example, according to the first SPS configuration, the terminal equipment determines to receive the PDSCH at such time-domain positions as slot $n-2*P$, slot $n-P$, slot n, slot $n+P$, and slot $n+2*P$, etc.; where, P refers to the period of the SPS. If a slot where the deactivation control information is located is $n+1$, at least slot $n-2*P$, slot $n-P$ and slot n are earlier or no later than the slot where the deactivation control information is located (slot $n+1$). And in slot $n-2*P$, slot $n-P$ and slot n, slot n is most close to slot $n+1$, therefore, in this scenario, slot n is the above first slot.

In at least one embodiment, the mapping relationship between the SPS configuration set and the priority or HARQ-ACK codebook of the HARQ-ACK information to which the control information corresponds is indicated by configuration information. The configuration information is, for example, RRC configuration information, which may also be referred to as RRC signaling; however, this disclosure is not limited thereto.

In the embodiment of this disclosure, in some embodiments, the terminal equipment may further receive second configuration information, the second configuration information being used to indicate the terminal equipment to generate at least two HARQ-ACK codebooks. In other words, the second configuration information is used to configure at least two simultaneously constructed HARQ-ACK codebooks.

For example, the second configuration information is a list (pdsch-HARQ-ACK-Codebook-List), which includes configuration information (pdsch-HARQ-ACK-Codebook) of two HARQ-ACK codebooks. Configuration information (pdsch-HARQ-ACK-Codebook) of each HARQ-ACK codebook is used to indicate whether the HARQ-ACK codebook is semi-static or dynamic.

Therefore, if the terminal equipment does not receive the second configuration information, it is possibly unnecessary for the terminal equipment to distinguish priorities to which the HARQ-ACK information corresponds. After receiving the second configuration information, the terminal equipment needs to generate at least two (including two) HARQ-ACK codebooks with different priorities, hence, in this case, it is necessary for the terminal equipment to distinguish HARQ-ACK codebooks (of different priorities) to which HARQ-ACK information corresponds. The addition of such a reception condition helps the terminal equipment to distinguish scenarios where the priority or HARQ-ACK codebook of the HARQ-ACK information to which the control information corresponds is determined according to the SPS configuration set, so as to avoid erroneously determining the priority or HARQ-ACK codebook to which the HARQ-ACK information corresponds.

In the embodiment of this disclosure, as shown in FIG. 4, the method may further include:

operation 405: the terminal equipment transmits a signal used for carrying the HARQ-ACK information to which the control information corresponds at a corresponding time-domain position according to the priority or HARQ-ACK codebook of the HARQ-ACK information to which the control information corresponds.

In the embodiment of this disclosure, after determining the priority or HARQ-ACK codebook of the HARQ-ACK information to which the control information (SPS PDSCH release) corresponds via operation 403, the terminal equipment may determine a PUCCH configuration associated with the HARQ-ACK information, and then transmit the signal used for carrying the HARQ-ACK information according to corresponding configuration information.

For example, when the HARQ-ACK information corresponds to a low priority (for example, a signaling value to which RRC corresponds is 0, priority=0), the HARQ-ACK information corresponds to PUCCH configuration #1, and its associated priority index is 0.

For example, when the HARQ-ACK information corresponds to a high priority (for example, a signaling value to which RRC corresponds is 1, priority=1), the HARQ-ACK information corresponds to PUCCH configuration #2, and its associated priority index is 1.

For another example, when the HARQ-ACK information corresponds to HARQ-ACK codebook #0, the HARQ-ACK information corresponds to PUCCH configuration #1, wherein, a priority associated with HARQ-ACK codebook #0 is identical to a priority associated with PUCCH configuration #1 (with a priority index of 0).

For a further example, when the HARQ-ACK information corresponds to HARQ-ACK codebook #1, the HARQ-ACK information corresponds to PUCCH configuration #2, wherein, a priority associated with HARQ-ACK codebook #1 is identical to a priority associated with PUCCH configuration #2 (with a priority index of 1).

In an embodiment, if the PUCCH configuration to which the above priority or HARQ-ACK codebook corresponds does not include or is not configured with an indication on the length of a sub-slot, the terminal equipment transmits the signal in units of slots.

For example, when the PUCCH configuration does not include or is not configured with Sub-slotLength-For-PUCCH, the terminal equipment transmits the corresponding HARQ-ACK information in units of slots according to information indicated by a PDSCH-to-HARQ_feedback timing indicator field in the SPS PDSCH release.

For example, the terminal equipment receives the SPS PDSCH release in slot n, and transmits corresponding HARQ-ACK information in slot n+k according to a time-domain offset k indicated by a PDSCH-to-HARQ_feedback timing indicator field in the SPS PDSCH release.

In another embodiment, if the PUCCH configuration to which the above priorities or HARQ-ACK codebooks correspond includes or is configured with an indication on the length of a sub-slot, the terminal equipment transmits the signal in units of sub-slots. A symbol length to which the sub-slot corresponds may be at least 2 or 7.

For example, when the PUCCH configuration includes or is configured with Sub-slotLength-ForPUCCH, the terminal equipment transmits the corresponding HARQ-ACK in units of sub-slots according to the information indicated by the PDSCH-to-HARQ_feedback timing indicator field in the SPS PDSCH release.

For example, with reference to sub-slots for PUCCH transmissions, the terminal equipment receives the SPS PDSCH release in sub-slot n, and transmits the corresponding HARQ-ACK information in sub-slot n+k according to the time-domain offset k indicated by the PDSCH-to-HARQ_feedback timing indicator field in the SPS PDSCH release.

According to the method of the embodiment of this disclosure, as described above, a problem of different understandings by the network device and the terminal equipment is avoided and the reliability of the system is enhanced. In addition, the method may further help the terminal equipment to determine the time-domain position for transmitting the HARQ-ACK information, thereby improving the reliability of the system.

Embodiment of a Third Aspect

The embodiment of the third aspect of this disclosure provides a wireless communication method, applicable to a terminal equipment. This embodiment differs from the wireless communication method of the embodiment of the first aspect and the wireless communication method of the embodiment of the second aspect in that in the embodiment of this disclosure, the terminal equipment, according to control information, determines priorities or HARQ-ACK codebooks of HARQ-ACK information corresponding to the control information or associated with the control information.

FIG. 5 is a schematic diagram of the wireless communication method of the embodiment of this disclosure. As shown in FIG. 5, the method includes:

operation 501: a terminal equipment receives first configuration information and control information, the first configuration information indicating a list, the list being associated with one or more than one SPS configuration set, and the control information corresponding to one of the SPS configuration sets; and operation 503: the terminal equipment determines a priority or an HARQ-ACK codebook of HARQ-ACK information to which the control information corresponds according to the control information.

In the embodiment of this disclosure, the terminal equipment may determine the priority or HARQ-ACK codebook of the HARQ-ACK information corresponding to the control information or associated with the control information according to the control information, thereby avoiding a problem of different understandings by the network device and the terminal equipment and enhancing the reliability of the system. In addition, the method may further help the terminal equipment to determine the time-domain position for transmitting the HARQ-ACK information, thereby improving the reliability of the system.

In the embodiment of this disclosure, in operation 501, for example, the terminal equipment receives first configuration information transmitted by the network device, such as RRC configuration information (SPS-ConfigDeactivationStateList), the first configuration information being used to indicate a list, the list being associated with the one or more than one SPS configuration set. In one example, the list includes one or more than one state, and the number of the states possibly included in the list may be 1, 2, 3, . . . , 16, or, the number of the states possibly included in the list may be 1, 2, 3, . . . , $2^{N\_HPN}$; where, N_HPN refers to the length of an HPN field in DCI format 1_2, the length may be indicated by RRC signaling (e.g. HARQProcessNumber-Size-ForDCIFormat1_2); however, this disclosure is not limited thereto.

In at least one embodiment, the SPS configuration set is associated with one or more than one SPS configuration, and a mapping relationship between the SPS configuration set and the one or more than one SPS configuration may be indicated by configuration information. The configuration information here is, for example, RRC signaling (SPS-ConfigDeactivationState), which may also be referred to as RRC configuration information. In addition, the number of SPS configurations that the above SPS configuration set may be mapped to or associated with is 1, 2, 3, . . . , 8.

In the embodiment of this disclosure, the first configuration information may act on a bandwidth part (BWP), that is, the first configuration information may indicate configuration information on a specific BWP (bandwidth part); however, this disclosure is not limited thereto.

In the embodiment of this disclosure, "state" and "SPS configuration set" are equivalent, unless otherwise specified. For the sake of illustration, "SPS configuration set" shall be described by taking "state" as an example.

In the embodiment of this disclosure, the control information corresponds to an SPS configuration set, for example, an HPN field of the control information indicates the SPS configuration set. The control information (i.e. downlink control information (DCI)) is used to release the SPS configuration, which may also be referred to as "SPS PDSCH release". When the terminal equipment receives an SPS PDSCH release, the terminal equipment may determine the SPS configuration set to which it corresponds according to the SPS PDSCH release. For example, the terminal equipment may determine the corresponding SPS configuration set according to a codepoint of the HPN field.

For example, when the length of the HPN field is 4 bits, an HPN field '0000' represents an SPS configuration set #1; in addition, an HPN field '0001' represents an SPS configuration set #2, and so on, and an HPN field '1111' represents an SPS configuration set #16.

For another example, when the length of the HPN field is 2 bits, for example, when the length of an HPN field of a DCI format is configurable, such as DCI format 1_2, HPN field '00' represents an SPS configuration set #1; in addition, HPN field '01' represents an SPS configuration set #2, and so on, and HPN field '11' represents an SPS configuration set #4.

In the embodiment of this disclosure, assuming that the length of the HPN field is M, a total number of corresponding SPS configuration sets is at most $2^M$.

In the embodiment of this disclosure, the CRC of the above control information may be scrambled by a CS-RNTI, and a new indicator (a new data indicator) field of the control information may be 0.

In one example, all bits to which a modulation and coding scheme field of the control information corresponds are 1, and all bits to which a frequency-domain resource assignment field of the control information corresponds are 1, the control information includes a redundancy version (RV) field, all bits to which the RV field corresponds being 0.

In another example, all bits to which the modulation and coding scheme field of the control information corresponds are 1, and all bits to which the frequency-domain resource assignment field of the control information corresponds are 1, and the control information includes no redundancy version (RV) field.

In the above two examples, the terminal equipment achieves the validation via the control information (the validation of the DCI format is achieved).

In the embodiment of this disclosure, if all the MCS field, the FDRA field and the RV field of the control information satisfy the settings in the first example, it may be said that validation of the DCI format is achieved. Or, if all the MCS field, the FDRA field and the RV field of the control information satisfy the settings in the second example, it may be said that validation of the DCI format is achieved. In the embodiment of this disclosure, if the validation is achieved, the terminal equipment deems that the information of the DCI format is valid SPS deactivation information. If the verification is not achieved, the terminal equipment drops all information in the DCI.

In the embodiment of this disclosure, the control information (i.e. downlink control information (DCI)) is used to release the SPS configuration, which may also be referred to as "SPS PDSCH release".

In at least one embodiment, in operation 503, that the terminal equipment determines the priority of the HARQ-ACK information to which the control information corresponds according to the control information may be that the terminal equipment determines the priority of the HARQ-ACK information to which the control information corresponds according to a format (DCI format) of the control information.

For example, when DCI formats to which the SPS PDSCH release corresponds are 1_0, 1_1, the priority of the HARQ-ACK information to which the SPS PDSCH release corresponds is a low priority; and when a DCI format to which the SPS PDSCH release corresponds is 1_2, the priority of the HARQ-ACK information to which the SPS PDSCH release corresponds is a high priority.

Thus, the terminal equipment may determine the priority of the HARQ-ACK information of the corresponding SPS PDSCH release according to the DCI format, so that the terminal equipment may learn the priority to which the HARQ-ACK information of the SPS PDSCH release corresponds before reading contents of the SPS PDSCH release, thereby enabling hardware of the terminal equipment to start processing corresponding information earlier.

For another example, the RRC signaling configures that a specific DCI format is associated with a specific priority. If the SPS PDSCH release is scheduled by using the specific DCI format, the priority of the HARQ-ACK information to which the SPS PDSCH release corresponds is a corresponding specific priority. For example, if DCI format 1_2 is mapped with a high priority according to RRC signaling, when the DCI format to which the SPS PDSCH release corresponds is 1_2, a priority of HARQ-ACK information to which it corresponds is a high priority. On the contrary, if DCI format 1_2 is mapped with a low priority according to RRC signaling, when the DCI format to which the SPS PDSCH release corresponds is 1_2, a priority of HARQ-ACK information to which it corresponds is a low priority.

Thus, the terminal equipment may determine the priority of the HARQ-ACK information of the corresponding SPS PDSCH release according to the DCI format, in this way, the terminal equipment may learn the priority to which the HARQ-ACK information of the SPS PDSCH release corresponds before reading contents of the SPS PDSCH release, thereby enabling hardware of the terminal equipment to start processing corresponding information earlier. In addition, the terminal equipment may specify different DCI formats according to RRC, so that the HARQ-ACK priority to which the DCI format (of the SPS PDSCH release) corresponds may be flexibly configured, thereby making scheduling of the system more flexible.

In at least one embodiment, in operation 503, that the terminal equipment determines the priority of the HARQ-ACK information to which the control information corresponds according to the control information may be that the terminal equipment determines the priority of the HARQ-ACK information to which the control information corresponds according to a CRC scrambling RNTI of the control information.

For example, when the CRC scrambling RNTI of the SPS PDSCH release is a first RNTI (such as an HP-RNTI), the priority of the HARQ-ACK information to which the SPS PDSCH release corresponds is a high priority; and when the CRC scrambling RNTI of the SPS PDSCH release is a second RNTI (such as an RNTI other than the HP-RNTI, e.g. a C-RNTI), the priority of the HARQ-ACK information to which the SPS PDSCH release corresponds is a low priority.

Thus, the terminal equipment may judge the priority of the HARQ-ACK information of the corresponding SPS PDSCH release according to the RNTI of the SPS PDSCH release. In this way, the terminal equipment may learn the priority to which the HARQ-ACK information of the SPS PDSCH release corresponds before reading contents of the SPS PDSCH release, thereby enabling hardware of the terminal equipment to start processing corresponding information earlier. In addition, use of the RNTI for distinguishing will not increase categories of DCI formats needing to be blindly detected by the UE.

In at least one embodiment, in operation 503, that the terminal equipment determines the priority of the HARQ-ACK information to which the control information corresponds according to the control information may be that the terminal equipment determines the priority of the HARQ-ACK information to which the control information corresponds according to a control resource set (CORESET) or search space (SS) of the control information.

For example, when the CORESET to which the SPS PDSCH release corresponds is a first CORESET, the priority of the HARQ-ACK information to which the SPS PDSCH release corresponds is a high priority; and when the CORESET to which the SPS PDSCH release corresponds is a second CORESET, the priority of the HARQ-ACK information to which the SPS PDSCH release corresponds is a low priority, wherein, a mapping relationship between the first CORESET and a priority may be configured by RRC signaling; likewise, a mapping relationship between the second CORESET and a priority may also be configured by RRC signaling.

Thus, the terminal equipment may determine the priority of the HARQ-ACK information of a corresponding SPS PDSCH release according to the CORESET of the SPS PDSCH release. In this way, the terminal equipment may learn the priority to which the HARQ-ACK information of the SPS PDSCH release corresponds before reading contents of the SPS PDSCH release, thereby enabling hardware of the terminal equipment to start processing corresponding information earlier. In addition, as a CORESET may be used to distinguish different TRPs in multi-TRP scenarios, use of the CORESET for distinguishing may be helpful to setup an association between the priority of the HARQ-ACK information and indices of the TRPs, which is beneficial to the convenience of scheduling in these scenarios.

For another example, when the search space to which the SPS PDSCH release corresponds is a first search space, the priority of the HARQ-ACK information to which the SPS PDSCH release corresponds is a high priority; and when the search space to which the SPS PDSCH release corresponds is a second search space, the priority of the HARQ-ACK information to which the SPS PDSCH release corresponds is a low priority, wherein, a mapping relationship between the first search space and a priority may be configured by RRC signaling; likewise, a mapping relationship between the second search space and a priority may also be configured by RRC signaling.

Thus, the terminal equipment may determine the priority of the HARQ-ACK information of a corresponding SPS PDSCH release according to the CORESET of the SPS PDSCH release. In this way, the terminal equipment may learn the priority to which the HARQ-ACK information of the SPS PDSCH release corresponds before reading contents of the SPS PDSCH release, thereby enabling hardware of the terminal equipment to start processing corresponding information earlier.

In at least one embodiment, in operation 503, that the terminal equipment determines the priority of the HARQ-ACK information to which the control information corresponds according to the control information may be that the terminal equipment determines the priority of the HARQ-ACK information to which the control information corresponds according to a field of the control information.

For example, the SPS PDSCH release includes a field for indicating a priority, the length of the field being 1 bit. When the field is '0', the priority of the HARQ-ACK information to which the SPS PDSCH release corresponds is a low priority; and when the field is '1', the priority of the HARQ-ACK information to which the SPS PDSCH release corresponds is a high priority.

Thus, the terminal equipment may determine the priority of the HARQ-ACK information of a corresponding SPS PDSCH release according to the indication of the field included in the SPS PDSCH release. In this way, the terminal equipment may directly obtain the priority indication information without additional implicit information. For example, the terminal equipment may use normal C-RNTI or CS-RNTI scrambling, which may reduce complexity of blind detection; the terminal equipment may monitor on any CORESET/search space, optional CORESET/search space is/are not limited; and the terminal equipment may use any DCI format, and the DCI format available for use is not limited.

In this embodiment, the field may be a priority indication field; however, this disclosure is not limited thereto.

In at least one embodiment, in operation 503, that the terminal equipment determines the HARQ-ACK codebook of the HARQ-ACK information to which the control information corresponds according to the control information may be that the terminal equipment determines the HARQ-ACK codebook of the HARQ-ACK information to which the control information corresponds according to a format (DCI format) of the control information.

For example, when DCI formats to which the SPS PDSCH release corresponds are 1_0, 1_1, the HARQ-ACK codebook of the HARQ-ACK information to which the SPS PDSCH release corresponds is HARQ-ACK codebook #0; and when a DCI format to which the SPS PDSCH release corresponds is 1_2, the HARQ-ACK codebook of the HARQ-ACK information to which the SPS PDSCH release corresponds is HARQ-ACK codebook #1.

Thus, the terminal equipment may determine the HARQ-ACK codebook of the HARQ-ACK information to which SPS PDSCH release corresponds according to the DCI format, so that the terminal equipment may learn the HARQ- ACK codebook to which the HARQ-ACK information of the SPS PDSCH release corresponds before reading contents of the SPS PDSCH release, thereby enabling hardware of the terminal equipment to start processing corresponding information earlier.

For another example, the RRC signaling configures that a specific DCI format is associated with a specific HARQ-ACK codebook. If the SPS PDSCH release is scheduled by using the specific DCI format, the HARQ-ACK information corresponding to the SPS PDSCH release corresponds to the specific HARQ-ACK codebook. For example, if DCI format 1_2 is mapped with HARQ-ACK codebook #1 according to RRC signaling, when the DCI format to which the SPS PDSCH release corresponds is 1_2, its corresponding HARQ-ACK information corresponds to HARQ-ACK codebook #1. On the contrary, if DCI format 1_2 is mapped with HARQ-ACK codebook #0 according to RRC signaling, when the DCI format to which the SPS PDSCH release corresponds is 1_2, its corresponding HARQ-ACK information corresponds to HARQ-ACK codebook #0.

Thus, the terminal equipment may determine the HARQ-ACK codebook of the HARQ-ACK information of the corresponding SPS PDSCH release according to the DCI format, in this way, the terminal equipment may learn the HARQ-ACK codebook to which the HARQ-ACK information of the SPS PDSCH release corresponds before reading contents of the SPS PDSCH release, thereby enabling hardware of the terminal equipment to start processing corresponding information earlier. In addition, the terminal equipment may specify different DCI formats according to RRC, so that the HARQ-ACK codebook to which the DCI format (of the SPS PDSCH release) corresponds may be flexibly configured, thereby making scheduling of the system more flexible.

In at least one embodiment, in operation 503, that the terminal equipment determines the HARQ-ACK codebook of the HARQ-ACK information to which the control information corresponds according to the control information may be that the terminal equipment determines the HARQ-ACK codebook of the HARQ-ACK information to which the control information corresponds according to a CRC scrambling RNTI of the control information.

For example, when the CRC scrambling RNTI of the SPS PDSCH release is a first RNTI (such as an HP-RNTI), the HARQ-ACK codebook of the HARQ-ACK information to which the SPS PDSCH release corresponds is HARQ-ACK codebook #1 of a high priority; and when the CRC scrambling RNTI of the SPS PDSCH release is a second RNTI (such as an RNTI other than the HP-RNTI, e.g. a C-RNTI), the HARQ-ACK codebook of the HARQ-ACK information to which the SPS PDSCH release corresponds is HARQ-ACK codebook #0 of a low priority.

Thus, the terminal equipment may determine the HARQ-ACK codebook of the HARQ-ACK information of a corresponding SPS PDSCH release according to the RNTI of the SPS PDSCH release, in this way, the terminal equipment may learn the HARQ-ACK codebook to which the HARQ-ACK information of the SPS PDSCH release corresponds before reading contents of the SPS PDSCH release, thereby enabling hardware of the terminal equipment to start processing corresponding information earlier. In addition, use of the RNTI for distinguishing will not increase categories of DCI formats needing to be blindly detected by the terminal equipment.

In at least one embodiment, in operation 503, that the terminal equipment determines the HARQ-ACK codebook of the HARQ-ACK information to which the control information corresponds according to the control information may be that the terminal equipment determines the HARQ-ACK codebook of the HARQ-ACK information to which the control information corresponds according to a control resource set (CORESET) or search space (SS) of the control information.

For example, when the CORESET to which the SPS PDSCH release corresponds is a first CORESET, the HARQ-ACK codebook of the HARQ-ACK information to which the SPS PDSCH release corresponds is HARQ-ACK codebook #1 of a high priority; and when the CORESET to which the SPS PDSCH release corresponds is a second CORESET, the HARQ-ACK codebook of the HARQ-ACK information to which the SPS PDSCH release corresponds is HARQ-ACK codebook #0 of a low priority, wherein, a mapping relationship between the first CORESET and HARQ-ACK codebook #1 may be configured by RRC signaling; likewise, a mapping relationship between the second CORESET and HARQ-ACK codebook #0 may also be configured by RRC signaling.

Thus, the terminal equipment may determine the HARQ-ACK codebook of the HARQ-ACK information of a corresponding SPS PDSCH release according to the CORESET of the SPS PDSCH release. In this way, the terminal equipment may learn the HARQ-ACK codebook to which the HARQ-ACK information of the SPS PDSCH release corresponds before reading contents of the SPS PDSCH release, thereby enabling hardware of the terminal equipment to start processing corresponding information earlier. In addition, as a CORESET may be used to distinguish different TRPs in multi-TRP scenarios, use of the CORESET for distinguishing may be helpful to setup an association between the HARQ-ACK codebook of the HARQ-ACK information and indices of the TRPs, which is beneficial to the convenience of scheduling in these scenarios.

For another example, when the search space to which the SPS PDSCH release corresponds is a first search space, the HARQ-ACK codebook of the HARQ-ACK information to which the SPS PDSCH release corresponds is HARQ-ACK codebook #1 of a high priority; and when the search space to which the SPS PDSCH release corresponds is a second search space, the HARQ-ACK codebook of the HARQ-ACK information to which the SPS PDSCH release corresponds is HARQ-ACK codebook #0 of a low priority, wherein, a mapping relationship between the first search space and HARQ-ACK codebook #1 may be configured by RRC signaling; likewise, a mapping relationship between the second search space and HARQ-ACK codebook #0 may also be configured by RRC signaling.

Thus, the terminal equipment may determine the HARQ-ACK codebook of the HARQ-ACK information of a corresponding SPS PDSCH release according to the search space of the SPS PDSCH release. In this way, the terminal equipment may learn the HARQ-ACK codebook to which the HARQ-ACK information of the SPS PDSCH release corresponds before reading contents of the SPS PDSCH release, thereby enabling hardware of the terminal equipment to start processing corresponding information earlier.

In at least one embodiment, in operation 503, that the terminal equipment determines the HARQ-ACK codebook of the HARQ-ACK information to which the control information corresponds according to the control information may be that the terminal equipment determines the HARQ-ACK codebook of the HARQ-ACK information to which the control information corresponds according to a field of the control information.

For example, the SPS PDSCH release includes a field for indicating a priority, the length of the field being 1 bit. When the field is '0', the HARQ-ACK codebook of the HARQ-ACK information to which the SPS PDSCH release corresponds is HARQ-ACK codebook #0 of a low priority; and when the field is '1', the HARQ-ACK codebook of the HARQ-ACK information to which the SPS PDSCH release corresponds is HARQ-ACK codebook #1 of a high priority.

Thus, the terminal equipment may determine the HARQ-ACK codebook of the HARQ-ACK information of a corresponding SPS PDSCH release according to the indication of the field included in the SPS PDSCH release. In this way, the terminal equipment may directly obtain the HARQ-ACK codebook indication information without additional implicit information. For example, the terminal equipment may use normal C-RNTI or CS-RNTI scrambling, which may reduce complexity of blind detection; the terminal equipment may monitor on any CORESET/search space, optional CORESET/search space is/are not limited; and the terminal equipment may use any DCI format, and the DCI format available for use is not limited.

In this embodiment, the field may be a priority indication field; however, this disclosure is not limited thereto.

In the embodiments of this disclosure, in some embodiments, the terminal equipment may further receive second configuration information, the second configuration information being used to indicate the terminal equipment to generate at least two HARQ-ACK codebooks. In other words, the second configuration information is used to configure at least two simultaneously constructed HARQ-ACK codebooks.

For example, the second configuration information is a list (pdsch-HARQ-ACK-Codebook-List), which includes configuration information of two HARQ-ACK codebooks (pdsch-HARQ-ACK-Codebook). Configuration information of each HARQ-ACK codebook (pdsch-HARQ-ACK-Codebook) is used to indicate whether the HARQ-ACK codebook is semi-static or dynamic.

Thus, if the terminal equipment does not receive the second configuration information, it is possibly unnecessary for the terminal equipment to distinguish priorities to which the HARQ-ACK information corresponds. After receiving the second configuration information, the terminal equipment needs to generate at least two (including two) HARQ-ACK codebooks with different priorities, hence, in this case, it is necessary for the terminal equipment to distinguish HARQ-ACK codebooks (of different priorities) to which the HARQ-ACK information corresponds. The addition of such a reception condition helps the terminal equipment to distinguish scenarios where the priority or HARQ-ACK codebook of the HARQ-ACK information to which the control information corresponds is determined according to the control information, so as to avoid erroneously determining the priority or HARQ-ACK codebook to which the HARQ-ACK information corresponds.

In the embodiment of this disclosure, as shown in FIG. 5, the method may further include:

operation 505: the terminal equipment transmits a signal used for carrying the HARQ-ACK information to which the control information corresponds at a corresponding time-domain position according to the priority or HARQ-ACK codebook of the HARQ-ACK information to which the control information corresponds.

In the embodiment of this disclosure, after determining the priority or HARQ-ACK codebook of the HARQ-ACK information to which the control information (SPS PDSCH release) corresponds in operation 503, the terminal equipment may determine a PUCCH configuration associated with the HARQ-ACK information, and then transmit the signal used for carrying the HARQ-ACK information according to corresponding configuration information.

For example, when the HARQ-ACK information corresponds to a low priority (for example, a signaling value to which RRC corresponds is 0, priority=0), the HARQ-ACK information corresponds to PUCCH configuration #1, and its associated priority index is 0.

For example, when the HARQ-ACK information corresponds to a high priority (for example, a signaling value to which RRC corresponds is 1, priority=1), the HARQ-ACK information corresponds to PUCCH configuration #2, and its associated priority index is 1.

For another example, when the HARQ-ACK information corresponds to HARQ-ACK codebook #0, the HARQ-ACK information corresponds to PUCCH configuration #1, wherein, the priority associated with HARQ-ACK codebook #0 is identical to the priority associated with PUCCH configuration #1 (with a priority index of 0).

For a further example, when the HARQ-ACK information corresponds to HARQ-ACK codebook #1, the HARQ-ACK information corresponds to PUCCH configuration #2, wherein, the priority associated with HARQ-ACK codebook #1 is identical to the priority associated with PUCCH configuration #2 (with a priority index of 1).

In an embodiment, if the PUCCH configuration to which the above priority or HARQ-ACK codebook corresponds does not include or is not configured with an indication on the length of a sub-slot, the terminal equipment transmits the signal in units of slots.

For example, when the PUCCH configuration does not include or is not configured with Sub-slotLength-For-PUCCH, the terminal equipment transmits the corresponding HARQ-ACK information in units of slots according to information indicated by a PDSCH-to-HARQ_feedback timing indicator field in the SPS PDSCH release.

For example, the terminal equipment receives the SPS PDSCH release in slot n, and transmits corresponding HARQ-ACK information in slot n+k according to a time-domain offset k indicated by a PDSCH-to-HARQ_feedback timing indicator field in the SPS PDSCH release.

In another embodiment, if the PUCCH configuration to which the above priorities or HARQ-ACK codebooks correspond includes or is configured with an indication on the length of a sub-slot, the terminal equipment transmits the signal in units of sub-slots. A symbol length to which the sub-slot corresponds may be at least 2 or 7.

For example, when the PUCCH configuration includes or is configured with Sub-slotLength-ForPUCCH, the terminal equipment transmits the corresponding HARQ-ACK information in units of sub-slots according to the information indicated by the PDSCH-to-HARQ_feedback timing indicator field in the SPS PDSCH release.

For example, with reference to sub-slots for PUCCH transmissions, the terminal equipment receives the SPS PDSCH release in sub-slot n, and transmits the corresponding HARQ-ACK information in sub-slot n+k according to the time-domain offset k indicated by the PDSCH-to-HARQ_feedback timing indicator field in the SPS PDSCH release.

According to the method of the embodiment of this disclosure, as described above, a problem of different understandings by the network device and the terminal equipment is avoided and the reliability of the system is enhanced. In addition, the method may further help the terminal equipment to determine the time-domain position for transmitting the HARQ-ACK information, thereby improving the reliability of the system.

Embodiment of a Fourth Aspect

The embodiment of the fourth aspect of this disclosure provides a wireless communication method, applicable to a network device. This method is processing at a network side corresponding to the method of the embodiment of the first aspect, with contents identical to those in the embodiment of the first aspect being not going to be described herein any further.

FIG. 6 is a schematic diagram of the wireless communication method of the embodiment of the fourth aspect of this disclosure. As shown in FIG. 6, the method includes:

operation 601: a network device transmits first configuration information to a terminal equipment, the first configuration information indicating that one or more than one SPS configuration is associated with an SPS configuration set, the one or more than one SPS configuration corresponding to identical priorities or identical HARQ-ACK codebooks.

In the embodiment of this disclosure, as described in the embodiment of the first aspect, the first configuration information may act on a bandwidth part.

In the embodiment of this disclosure, as shown in FIG. 6, the method may further include:

operation 603: the network device transmits control information to the terminal equipment, an HPN field of the control information indicating the SPS configuration set; and operation 605: the network device receives a signal used for carrying HARQ-ACK information to which the control information corresponds according to the priority or HARQ-ACK codebook to which the one or more than one SPS configurations corresponds at a corresponding time-domain position.

In at least one embodiment, as described in the embodiment of the first aspect, the CRC of the control information may be scrambled by a CS-RNTI.

In at least one embodiment, as described in the embodiment of the first aspect, a new data indicator field of the control information may be 0.

In at least one embodiment, as described in the embodiment of the first aspect, all bits to which a modulation and coding scheme field of the control information corresponds are 1, and all bits to which a frequency-domain resource assignment field of the control information corresponds are 1, the control information includes a redundancy version (RV) field, all bits to which the RV field corresponds being 0. Alternatively, the validation of the control information is achieved (the validation of the DCI format is achieved).

In at least one embodiment, as described in the embodiment of the first aspect, all bits to which a modulation and coding scheme field of the control information corresponds are 1, and all bits to which a frequency-domain resource assignment field of the control information corresponds are 1, the control information does not include a redundancy version (RV) field. Alternatively, the validation of the control information is achieved (the validation of the DCI format is achieved).

In at least one embodiment, as described in the embodiment of the first aspect, the length of the HPN field of the control information is M, and the total number of SPS configuration sets to which the HPN field corresponds is at most $2^M$.

In the embodiment of this disclosure, corresponding to the embodiment of the first aspect, the network device may further transmit second configuration information, the second configuration information being used to indicate the terminal equipment to generate at least two HARQ-ACK codebooks. In other words, the second configuration information is used to configure at least two simultaneously constructed HARQ-ACK codebooks.

For example, the second configuration information is a list (pdsch-HARQ-ACK-Codebook-List), which includes configuration information (pdsch-HARQ-ACK-Codebook) of two HARQ-ACK codebooks. Configuration information (pdsch-HARQ-ACK-Codebook) of each HARQ-ACK codebook is used to indicate whether the HARQ-ACK codebook is semi-static or dynamic.

Thus, if the network device does not transmit the second configuration information, it may not be necessary for the network device to distinguish priorities to which the HARQ-ACK information corresponds. After transmitting the second configuration information, the HARQ-ACK information received by the network device may possibly correspond to different priorities, hence, in this case, it is necessary for the network device to distinguish HARQ-ACK codebooks (of different priorities) to which the HARQ-ACK information corresponds. The addition of such a reception condition is helpful to the network device in distinguishing scenarios where identical priorities or identical HARQ-ACK codebooks are corresponded according to the one or more than one SPS configuration, so as to avoid erroneously determining the priorities or HARQ-ACK codebooks to which the HARQ-ACK information corresponds.

In at least one embodiment, corresponding to the embodiment of the first aspect, the PUCCH parameter configuration information to which the priority or HARQ-ACK codebook corresponds does not include or is not configured with an indication on the length of a sub-slot, and the network device receives the signal in units of slots.

In at least one embodiment, corresponding to the embodiment of the first aspect, the PUCCH parameter configuration information to which the priority or HARQ-ACK codebook corresponds includes or is configured with an indication on the length of a sub-slot, and the network device receives the signal in units of sub-slots.

According to the method of the embodiment of this disclosure, as described above, a situation where the network device is unable to determine the priority to which the HARQ-ACK information corresponds may be avoided, and the reliability of the system is enhanced.

Embodiment of a Fifth Aspect

Embodiment of the fifth aspect of this disclosure provides a wireless communication apparatus, configured in a terminal equipment. As principles of the apparatus for solving problems are similar to that of the method of the embodiment of the first aspect, reference may be made to the implementations of the method of the embodiment of the first aspect for implementations of this apparatus, with identical parts being not going to be described herein any further.

FIG. 7 is a schematic diagram of the wireless communication apparatus 700 of this embodiment. As shown in FIG. 7, the apparatus 700 includes: a receiving unit 701 configured to receive first configuration information, the first configuration information indicating that one or more than one SPS configuration is associated with an SPS configuration set, the one or more than one SPS configuration corresponding to identical priorities or identical HARQ-ACK codebooks.

In at least one embodiment, the first configuration information acts on a bandwidth part.

In at least one embodiment, the receiving unit 701 further receives control information, an HPN field of the control information indicating the SPS configuration set.

In at least one embodiment, the CRC of the control information is scrambled by a CS-RNTI.

In at least one embodiment, a new data indicator field of the control information is 0.

In at least one embodiment, all bits to which a modulation and coding scheme field of the control information corresponds are 1, and all bits to which a frequency-domain resource assignment field of the control information corresponds are 1, the control information includes a redundancy version field, all bits to which the redundancy version field of the control information being 0. Alternatively, the validation of the control information is achieved (the validation of the DCI format is achieved).

In at least one embodiment, all bits to which a modulation and coding scheme field of the control information corresponds are 1, and all bits to which a frequency-domain resource assignment field of the control information corresponds are 1, the control information does not include a redundancy version field. Alternatively, the validation of the control information is achieved (the validation of the DCI format is achieved).

In at least one embodiment, the length of the HPN field of the control information is M, and the total number of SPS configuration sets to which the HPN field corresponds is at most $2^M$.

In at least one embodiment, the receiving unit 701 further receives second configuration information, the second configuration information being used to indicate the terminal equipment to generate two HARQ-ACK codebooks.

In at least one embodiment, as shown in FIG. 7, the apparatus 700 further includes:

a transmitting unit 702 configured to transmit a signal used for carrying the HARQ-ACK information to which the control information corresponds at a corresponding time-domain position according to the priority or HARQ-ACK codebook to which the one or more than one SPS configuration corresponds.

In at least one embodiment, the PUCCH parameter configuration information to which the priority or HARQ-ACK codebook corresponds does not include or is not configured with an indication on the length of a sub-slot, and the transmitting unit 702 transmits the signal in units of slots.

In at least one embodiment, the PUCCH parameter configuration information to which the priority or HARQ-ACK codebook corresponds includes or is configured with an indication on the length of a sub-slot, and the transmitting unit 702 transmits the signal in units of sub-slots.

According to the apparatus of the embodiment of this disclosure, as described in the embodiment of the first aspect, the reliability of the system is enhanced.

Embodiment of a Sixth Aspect

Embodiment of the sixth aspect of this disclosure provides a wireless communication apparatus, configured in a terminal equipment. As principles of the apparatus for solving problems are similar to that of the method of the embodiment of the second aspect, reference may be made to the implementations of the method of the embodiment of the second aspect for implementations of this apparatus, with identical parts being not going to be described herein any further.

FIG. 8 is a schematic diagram of the wireless communication apparatus 800 of this embodiment. As shown in FIG. 8, the apparatus 800 includes a receiving unit 801 and a determining unit 802. The receiving unit 801 is configured to receive first configuration information and control information, the first configuration information indicating a list, the list being associated with one or more than one SPS configuration set, and the control information corresponding to an SPS configuration set. And the determining unit 802 is configured to determine a priority or an HARQ-ACK codebook of HARQ-ACK information to which the control information corresponds according to the SPS configuration set to which the control information corresponds.

In at least one embodiment, the SPS configuration set is associated with one or more than one SPS configuration.

In at least one embodiment, the first configuration information acts on a bandwidth part.

In at least one embodiment, that the control information corresponds to an SPS configuration set includes that an HPN field of the control information indicates the SPS configuration set.

In at least one embodiment, the CRC of the control information is scrambled by a CS-RNTI.

In at least one embodiment, a new data indicator field of the control information is 0.

In at least one embodiment, the control information includes a redundancy version field; all bits to which a modulation and coding scheme field of the control information corresponds are 1, and all bits to which a frequency-domain resource assignment field of the control information corresponds are 1; all bits to which the RV field corresponds are 0. Alternatively, the validation of the control information is achieved (the validation of the DCI format is achieved).

In at least one embodiment, the control information does not include a redundancy version field; all bits to which a modulation and coding scheme field of the control information corresponds are 1, all bits to which a frequency-domain resource assignment field of the control information corresponds are 1. Alternatively, the validation of the control information is achieved (the validation of the DCI format is achieved).

In at least one embodiment, the length of the HPN field of the control information is M, and the total number of SPS configuration sets to which the HPN field corresponds is at most $2^M$.

In at least one embodiment, the determining unit 802 determines the priority of the HARQ-ACK information to which the control information corresponds according to an SPS configuration in the SPS configuration set. In at least one embodiment, the SPS configuration in the SPS configuration set refers to an activated/active SPS configuration in the SPS configuration set.

In at least one embodiment, the priority of the HARQ-ACK information to which the control information corresponds is one of the following: a highest priority in priorities to which SPS configurations in the SPS configuration set correspond; a lowest priority in priorities to which SPS configurations in the SPS configuration set correspond; a priority to which an SPS configuration with a lowest SPS configuration index in the SPS configuration set corresponds; a priority to which an SPS configuration with a highest SPS configuration index in the SPS configuration set corresponds; and a priority to which a recently activated SPS configuration in the SPS configuration set corresponds. In at least one embodiment, the recently activated SPS configuration in the SPS configuration set refers to: a recently activated SPS configuration in activated/active SPS configurations in the SPS configuration set.

In at least one embodiment, the activated/active SPS configuration refers to a first SPS configuration; wherein the receiving unit 801 receives the SPS PDSCH in a first slot according to information on the first SPS configuration, and the SPS PDSCH reception is activated in the first slot; wherein the first slot refers to a recent slot earlier than or not later than a slot where the control information is located and used for receiving the SPS PDSCH to which the first SPS configuration corresponds.

In at least one embodiment, the determining unit 802 determines the HARQ-ACK codebook of the HARQ-ACK information to which the control information corresponds according to an HARQ-ACK codebook to which an SPS configuration in the SPS configuration set corresponds. In at least one embodiment, the SPS configuration in the SPS configuration set refers to an activated/active SPS configuration in the SPS configuration set.

In at least one embodiment, the HARQ-ACK codebook of the HARQ-ACK information to which the control information corresponds is one of the following: an HARQ-ACK codebook of a highest priority or a highest priority index to which the SPS configurations in the SPS configuration set correspond; an HARQ-ACK codebook of a lowest priority or a lowest priority index to which the SPS configurations in the SPS configuration set correspond; an HARQ-ACK codebook to which an SPS configuration of a lowest SPS configuration index in the SPS configuration set corresponds; an HARQ-ACK codebook to which an SPS configuration of a highest SPS configuration index in the SPS configuration set corresponds; and an HARQ-ACK codebook to which a recently activated SPS configuration in the SPS configuration set corresponds. In at least one embodiment, the recently activated SPS configuration in the SPS configuration set refers to: a recently activated SPS configuration in the activated/active SPS configurations in the SPS configuration set.

In at least one embodiment, the activated/active SPS configuration refers to a first SPS configuration; wherein the terminal equipment receives an SPS PDSCH in the first slot according to information on the first SPS configuration, and the SPS PDSCH reception is activated in the first slot; wherein the first slot refers to a recent slot earlier than or not later than a slot where the control information is located and used for receiving the SPS PDSCH to which the first SPS configuration corresponds.

In at least one embodiment, a mapping relationship between the SPS configuration set and the priority or HARQ-ACK codebook of the HARQ-ACK information to which the control information corresponds is indicated by configuration information.

In at least one embodiment, the receiving unit 801 further receives second configuration information, the second configuration information being used to indicate the terminal equipment to generate two HARQ-ACK codebooks.

In at least one embodiment, as shown in FIG. 8, the apparatus 800 further includes:

a transmitting unit 803 configured to transmit a signal used for carrying the HARQ-ACK information to which the control information corresponds at a corresponding time-domain position according to the priority or HARQ-ACK codebook of the HARQ-ACK information to which the control information corresponds.

In at least one embodiment, PUCCH parameter configuration information to which the priority or HARQ-ACK codebook corresponds does not include or is not configured with an indication on the length of a sub-slot, and the transmitting unit 803 transmits the signal in units of slots.

In at least one embodiment, PUCCH parameter configuration information to which the priority or HARQ-ACK codebook corresponds includes or is configured with an indication on the length of a sub-slot, and the transmitting unit 803 transmits the signal in units of sub-slots.

According to the apparatus of the embodiment of this disclosure, as described in the embodiment of the second aspect, the reliability of the system is enhanced.

Embodiment of a Seventh Aspect

Embodiment of the seventh aspect of this disclosure provides a wireless communication apparatus, configured in a terminal equipment. As principles of the apparatus for solving problems are similar to that of the method of the embodiment of the third aspect, reference may be made to the implementations of the method of the embodiment of the third aspect for implementations of this apparatus, with identical parts being not going to be described herein any further.

FIG. 9 is a schematic diagram of the wireless communication apparatus 900 of this embodiment. As shown in FIG. 9, the apparatus 900 includes a receiving unit 901 and a determining unit 902. The receiving unit 901 is configured to receive first configuration information and control information, the first configuration information indicating a list, the list being associated with one or more than one SPS configuration set, and the control information corresponding to an SPS configuration set. And the determining unit 902 is configured to determine a priority or an HARQ-ACK codebook of HARQ-ACK information to which the control information corresponds according to the control information.

In at least one embodiment, the SPS configuration set is associated with one or more than one SPS configuration.

In at least one embodiment, the first configuration information acts on a bandwidth part.

In at least one embodiment, the control information corresponding to an SPS configuration set includes that an HPN field of the control information indicates the SPS configuration set.

In at least one embodiment, the CRC of the control information is scrambled by a CS-RNTI.

In at least one embodiment, a new data indicator field of the control information is 0.

In at least one embodiment, the control information includes a redundancy version field, all bits to which a modulation and coding scheme field of the control information corresponds are 1, all bits to which a frequency-domain resource assignment field of the control information corresponds are 1, and all bits to which the RV field corresponds are 0. Alternatively, the validation of the control information is achieved (the validation of the DCI format is achieved).

In at least one embodiment, the control information does not include a redundancy version field, all bits to which a modulation and coding scheme field of the control information corresponds are 1, all bits to which a frequency-domain resource assignment field of the control information corresponds are 1. Alternatively, the validation of the control information is achieved (the validation of the DCI format is achieved).

In at least one embodiment, the length of the HPN field of the control information is M, and the total number of SPS configuration sets to which the HPN field corresponds is at most $2^M$.

In at least one embodiment, the determining unit 902 determines the priority of the HARQ-ACK information to which the control information corresponds according to a format (DCI format) of the control information.

In at least one embodiment, the determining unit 902 determines the priority of the HARQ-ACK information to which the control information corresponds according to a CRC scrambling RNTI of the control information.

In at least one embodiment, the determining unit 902 determines the priority of the HARQ-ACK information to which the control information corresponds according to a control resource set (CORESET) or search space (SS) of the control information.

In at least one embodiment, the determining unit 902 determines the priority of the HARQ-ACK information to which the control information corresponds according to a field of the control information.

In at least one embodiment, the determining unit 902 determines a HARQ-ACK codebook of the HARQ-ACK information to which the control information corresponds according to a format (DCI format) of the control information.

In at least one embodiment, the determining unit 902 determines the HARQ-ACK codebook of the HARQ-ACK information to which the control information corresponds according to a CRC scrambling RNTI of the control information.

In at least one embodiment, the determining unit 902 determines the HARQ-ACK codebook of the HARQ-ACK information to which the control information corresponds according to a control resource set (CORESET) or search space (SS) of the control information.

In at least one embodiment, the determining unit 902 determines the HARQ-ACK codebook of the HARQ-ACK information to which the control information corresponds according to a field of the control information.

In at least one embodiment, the receiving unit 901 further receives second configuration information, the second configuration information being used to indicate the terminal equipment to generate two HARQ-ACK codebooks.

In at least one embodiment, as shown in FIG. 9, the apparatus 900 further includes:

a transmitting unit 903 configured to transmit a signal used for carrying the HARQ-ACK information to which the control information corresponds at a corresponding time-domain position according to the priority or HARQ-ACK codebook of the HARQ-ACK information to which the control information corresponds.

In at least one embodiment, PUCCH parameter configuration information to which the priority or HARQ-ACK codebook corresponds does not include or is not configured with an indication on the length of a sub-slot, and the transmitting unit 903 transmits the signal in units of slots.

In at least one embodiment, PUCCH parameter configuration information to which the priority or HARQ-ACK codebook corresponds includes or is configured with an indication on the length of a sub-slot, and the transmitting unit 903 transmits the signal in units of sub-slots.

According to the apparatus of the embodiment of this disclosure, as described in the embodiment of the third aspect, the reliability of the system is enhanced.

Embodiment of an Eighth Aspect

Embodiment of the eighth aspect of this disclosure provides a wireless communication apparatus, configured in a network device. As principles of the apparatus for solving problems are similar to that of the method of the embodiment of the fourth aspect, reference may be made to the implementations of the method of the embodiment of the fourth aspect for implementations of this apparatus, with identical parts being not going to be described herein any further.

Figure 10:
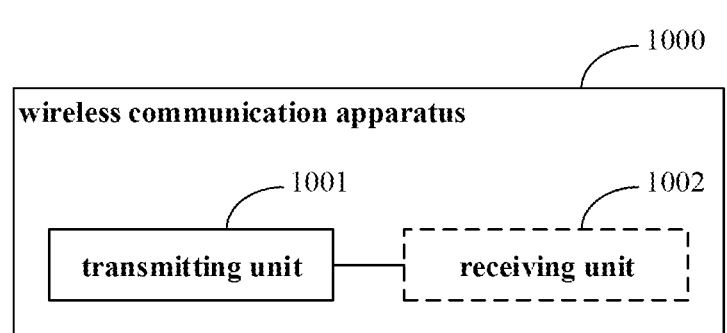
FIG. 10 is a schematic diagram of the wireless communication apparatus of the eighth aspect of the embodiments of this disclosure.

FIG. 10 is a schematic diagram of the wireless communication apparatus 1000 of this embodiment. As shown in FIG. 10, the apparatus 1000 includes a transmitting unit 1001 configured to transmit first configuration information to a terminal equipment, the first configuration information indicating that one or more than one SPS configuration is associated with an SPS configuration set, the one or more than one SPS configuration corresponding to identical priorities or identical HARQ-ACK codebooks.

In at least one embodiment, the first configuration information acts on a bandwidth part.

In at least one embodiment, the transmitting unit 1001 further transmits control information to the terminal equipment, an HPN field of the control information indicating the SPS configuration set. As shown in FIG. 10, the apparatus 1000 further includes:

a receiving unit 1002 configured to receive a signal used for carrying HARQ-ACK information to which the control information corresponds at a corresponding time-domain position according to the priority or HARQ-ACK codebook to which the one or more than one SPS configuration corresponds.

In at least one embodiment, the CRC of the control information is scrambled by a CS-RNTI.

In at least one embodiment, a new data indicator field of the control information is 0.

In at least one embodiment, all bits to which a modulation and coding scheme field of the control information corresponds are 1, and all bits to which a frequency-domain resource assignment field of the control information corresponds are 1, and the control information includes a redundancy version field, all bits to which the redundancy version field corresponds being 0. Alternatively, the validation of the control information is achieved (the validation of the DCI format is achieved).

In at least one embodiment, all bits to which a modulation and coding scheme field of the control information corresponds are 1, and all bits to which a frequency-domain resource assignment field of the control information corresponds are 1, and the control information does not include a redundancy version field. Alternatively, the validation of the control information is achieved (the validation of the DCI format is achieved).

In at least one embodiment, the length of the HPN field of the control information is M, and the total number of SPS configuration sets to which the HPN field corresponds is at most $2^M$.

In at least one embodiment, the transmitting unit 1001 further transmits second configuration information, the second configuration information being used to indicate the terminal equipment to generate two HARQ-ACK codebooks.

In at least one embodiment, corresponding to the embodiment of the fifth aspect, PUCCH parameter configuration information to which the priority or HARQ-ACK codebook corresponds does not include or is not configured with an indication on the length of a sub-slot, and the receiving unit 1002 receives the signal in units of slots.

In at least one embodiment, corresponding to the embodiment of the fifth aspect, PUCCH parameter configuration information to which the priority or HARQ-ACK codebook corresponds includes or is configured with an indication on the length of a sub-slot, and the receiving unit 1002 receives the signal in units of sub-slots.

According to the apparatus of the embodiment of this disclosure, as described in the embodiment of the fourth aspect, the reliability of the system is enhanced.

Embodiment of a Ninth Aspect

Embodiment of the ninth aspect of this disclosure provides a terminal equipment, including the apparatus as described in the embodiment of the fifth, or the sixth or the seventh aspect.

Figure 11:
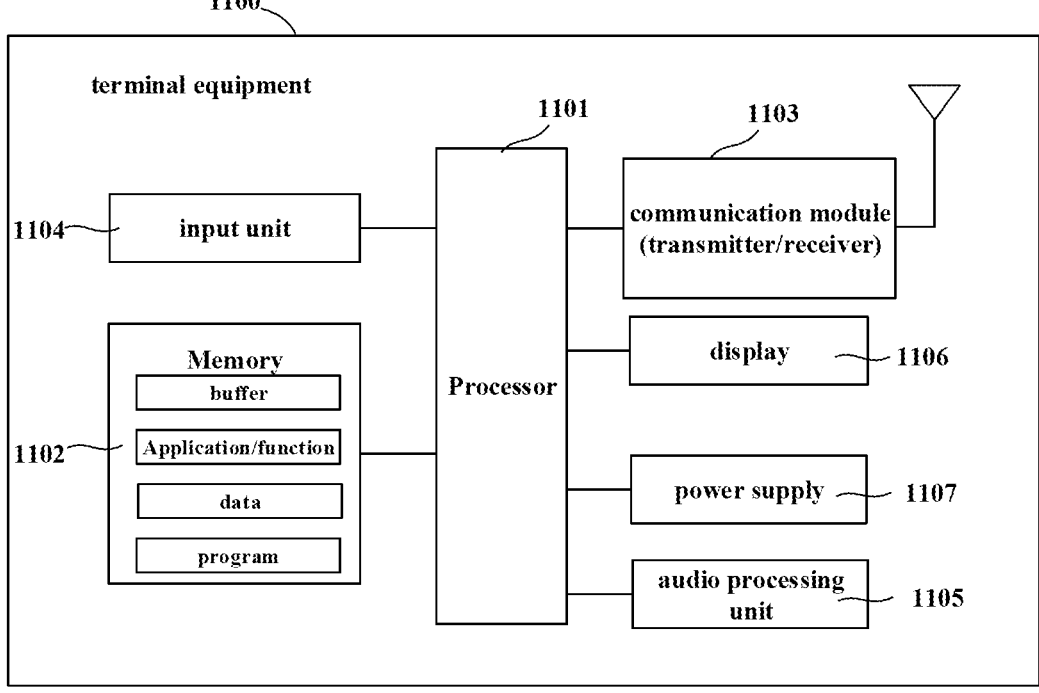
FIG. 11 is a schematic diagram of the terminal equipment of the ninth aspect of the embodiments of this disclosure.

FIG. 11 is a schematic diagram of the terminal equipment of the embodiment of this disclosure. As shown in FIG. 11, the terminal equipment 1100 may include a central processing unit 1101 and a memory 1102, the memory 1102 being coupled to the central processing unit 1101. It should be noted that this figure is illustrative only, and other types of structures may also be used, so as to supplement or replace this structure and achieve a telecommunications function or other functions.

In one embodiment, the functions of the apparatus described in the embodiment of the fifth, or the sixth or the seventh aspect may be integrated into the central processing unit 1101, and the central processing unit 1101 executes functions of the apparatus described in the embodiment of the fifth, or the sixth or the seventh aspect. The functions of the apparatus described in the embodiment of the fifth, or the sixth or the seventh aspect are incorporated herein, and shall not be described herein any further.

In another embodiment, the apparatus described in the embodiment of the fifth, or the sixth or the seventh aspect and the central processing unit 1101 may be configured separately; for example, the apparatus described in the embodiment of the fifth, or the sixth or the seventh aspect may be configured as a chip connected to the central processing unit 1101, and the functions of the apparatus described in the embodiment of the fifth, or the sixth or the seventh aspect are executed under control of the central processing unit 1101.

As shown in FIG. 11, the terminal equipment 1100 may further include a communication module 1103, an input unit 1104, an audio processing unit 1105, a display 1106 and a power supply 1107. It should be noted that the terminal equipment 1100 does not necessarily include all the parts shown in FIG. 11. Furthermore, the terminal equipment 1100 may include parts not shown in FIG. 11, and the related art may be referred to.

As shown in FIG. 11, the central processing unit 1101 is sometimes referred to as a controller or an operational control, which may include a microprocessor or other processor devices and/or logic devices. The central processing unit 1101 receives input and controls operations of components of the terminal equipment 1100.

The memory 1102 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1101 may execute programs stored in the memory 1102, so as to realize information storage or processing, etc. Functions of other parts are similar to those of the related art, which shall not be described herein any further. The parts of the terminal equipment 1100 may be realized by specific hardware, firmware, software, or any combination thereof, without departing from the scope of this disclosure.

With the terminal equipment of this embodiment, the reliability of the system is enhanced.

Embodiment of a Tenth Aspect

The embodiment of the tenth aspect provides a network device, including the apparatus described in the embodiment of the eighth aspect.

Figure 12:
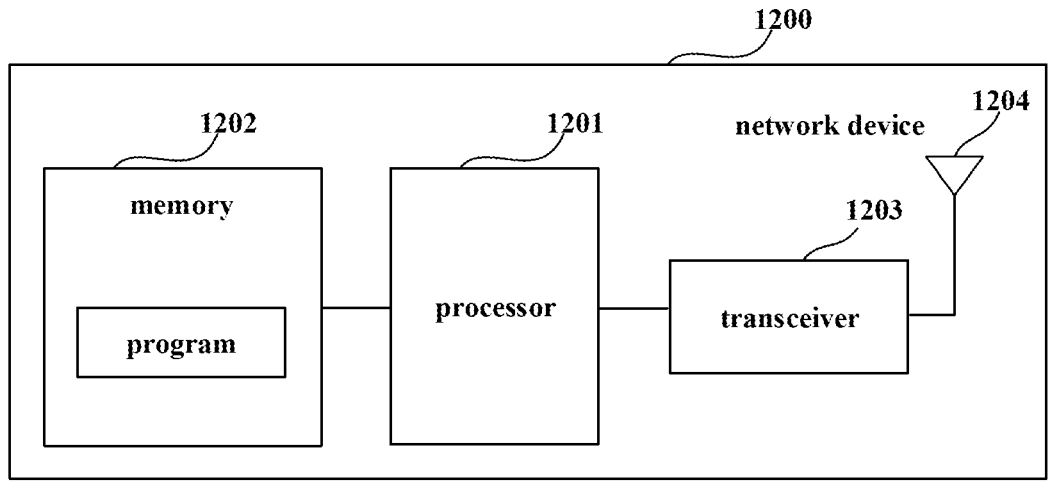
FIG. 12 is a schematic diagram of the network device of the tenth aspect of the embodiments of this disclosure.

FIG. 12 is a schematic diagram of a structure of the network device of the embodiment of this disclosure. As shown in FIG. 12, the network device 1200 may include a central processing unit (CPU) 1201 and a memory 1202, the memory 1202 being coupled to the central processing unit 1201. The memory 1202 may store various data, and furthermore, it may store program(s) for data processing, and execute the program(s) under control of the central processing unit 1201, so as to receive various information transmitted by a terminal equipment, and transmit various information to the terminal equipment.

In one embodiment, the functions of the apparatus described in the embodiment of the eighth aspect may be integrated into the central processing unit 1201, and the central processing unit 1201 executes functions of the apparatus described in the embodiment of the eighth aspect. The functions of the apparatus described in the embodiment of the eighth aspect are incorporated herein, and shall not be described herein any further.

In another embodiment, the apparatus described in the embodiment of the eighth aspect and the central processing unit 1201 may be configured separately; for example, the apparatus described in the embodiment of the eighth aspect may be configured as a chip connected to the central processing unit 1201, and the functions of the apparatus described in the embodiment of the eighth aspect are executed under control of the central processing unit 1201.

Furthermore, as shown in FIG. 12, the network device 1200 may include a transceiver 1203, and an antenna 1204, etc. Functions of the above components are similar to those in the related art, and shall not be described herein any further. It should be noted that the network device 1200 does not necessarily include all the parts shown in FIG. 12. Furthermore, the network device 1200 may include parts not shown in FIG. 12, and the related art may be referred to.

With the network device of this embodiment, the reliability of the system is enhanced.

Embodiment of an Eleventh Aspect

The embodiment of the eleventh aspect provides a communication system, including a network device and a terminal equipment. The network device is, for example, the network device 1200 described in the embodiment of the tenth aspect, and the terminal equipment is, for example, the terminal equipment 1000 described in the embodiment of the ninth aspect.

In this embodiment, the terminal equipment is, for example, a UE served by a gNB, and may include conventional compositions and functions of a terminal equipment in addition to the functions of the apparatus described in the embodiment of the fifth, or the sixth or the seventh aspect, which are as described in the embodiment of the ninth aspect, and shall not be described herein any further.

In this embodiment, the network device may be, for example, a gNB in NR, and may include conventional compositions and functions of a network device in addition to the functions of the apparatus described in the embodiment of the eighth aspect, which are as described in the embodiment of the tenth aspect, and shall not be described herein any further.

With the communication system of this embodiment, the reliability of the system is enhanced.

An embodiment of this disclosure provides a computer readable program, which, when executed in a terminal equipment, will cause a computer to carry out the method described in the embodiment of the first or the second or the third aspect in the terminal equipment.

An embodiment of this disclosure provides a storage medium storing a computer readable program, which will cause a computer to carry out the method described in the embodiment of the first or the second or the third aspect in a terminal equipment.

An embodiment of this disclosure provides a computer readable program, which, when executed in a network device, will cause a computer to carry out the method described in the embodiment of the fourth aspect in the network device.

An embodiment of this disclosure provides a storage medium storing a computer readable program, which will cause a computer to carry out the method described in the embodiment of the fourth aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The logic device may be field programmable logic devices, microprocessors, processors used in a computer, etc. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card that can be plugged into a mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a general purpose processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple microprocessors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the above implementations disclosed in the embodiments, following supplements are further disclosed.

1. A wireless communication apparatus, configured in a terminal equipment, wherein the apparatus includes:

a receiving unit configured to receive first configuration information, the first configuration information indicating that one or more than one SPS configuration is associated with an SPS configuration set, the one or more than one SPS configuration corresponding to identical priorities or identical HARQ-ACK codebooks.

1a. The apparatus according to supplement 1, wherein the first configuration information acts on a bandwidth part.

1b. The apparatus according to supplement 1, the receiving unit further receives second configuration information, the second configuration information being used to indicate the terminal equipment to generate at least two HARQ-ACK codebooks.

2. The apparatus according to supplement 1, wherein, the receiving unit further receives control information, an HPN field of the control information indicating the SPS configuration set.

2a. The apparatus according to supplement 2, wherein, the CRC of the control information is scrambled by a CS-RNTI.

2b. The apparatus according to supplement 2, wherein, a new data indicator field of the control information is 0.

2c. The apparatus according to supplement 2, wherein, all bits to which a modulation and coding scheme field of the control information corresponds are 1;

all bits to which a frequency-domain resource assignment field of the control information corresponds are 1;

the control information includes a redundancy version field;

and all bits to which the redundancy version field corresponds are 0.

2d. The apparatus according to supplement 2, wherein, all bits to which the modulation and coding scheme field of the control information corresponds are 1;

all bits to which the frequency-domain resource assignment field of the control information corresponds are 1;

and the control information includes no redundancy version field.

2e. The apparatus according to supplement 2c or 2d, wherein, the validation of the control information is achieved (the validation of the DCI format is achieved).

2f. The apparatus according to supplement 2, wherein the length of the HPN field of the control information is M, and a total number of SPS configuration sets to which the HPN field corresponds is at most $2^M$.

3. The apparatus according to supplement 2, wherein the apparatus further comprises:

a transmitting unit configured to transmit a signal used for carrying the HARQ-ACK information to which the control information corresponds at a corresponding time-domain position according to the priority or HARQ-ACK codebook to which the one or more than one SPS configuration corresponds.

4. The apparatus according to supplement 3, wherein, PUCCH parameter configuration information to which the priority or HARQ-ACK codebook corresponds does not include or is not configured with an indication on the length of a sub-slot, and the transmitting unit transmits the signal in units of slots.

5. The apparatus according to supplement 3, PUCCH parameter configuration information to which the priority or HARQ-ACK codebook corresponds includes or is configured with an indication on the length of a sub-slot, and the transmitting unit transmits the signal in units of sub-slots.

6. A wireless communication apparatus, configured in a terminal equipment, wherein the apparatus comprises:

a receiving unit configured to receive first configuration information and control information, the first configuration information indicating a list, the list being associated with one or more than one SPS configuration set, and the control information corresponding to an SPS configuration set; and a determining unit configured to determine a priority or an HARQ-ACK codebook of HARQ-ACK information to which the control information corresponds according to the SPS configuration set to which the control information corresponds.

6a. The apparatus according to supplement 6, wherein, the SPS configuration set is associated with one or more than one SPS configuration.

6b. The apparatus according to supplement 6, wherein the first configuration information acts on a bandwidth part.

6c. The apparatus according to supplement 6, wherein the control information corresponding to one of the SPS configuration sets includes:

that the HPN field of the control information indicates the SPS configuration set.

6d. The apparatus according to supplement 6, wherein, the CRC of the control information is scrambled by a CS-RNTI.

6e. The apparatus according to supplement 6, wherein, a new data indicator field of the control information is 0.

6f. The apparatus according to supplement 6, wherein, the control information includes a redundancy version field;

all bits to which a modulation and coding scheme field of the control information corresponds are 1;

all bits to which a frequency-domain resource assignment field of the control information corresponds are 1;

all bits to which the redundancy version field corresponds are 0.

6g. The apparatus according to supplement 6, wherein, the control information does not include a redundancy version field;

all bits to which a modulation and coding scheme field of the control information corresponds are 1;

all bits to which a frequency-domain resource assignment field of the control information corresponds are 1.

6h. The apparatus according to supplement 6f or 6g, wherein, the validation of the control information is achieved (the validation of the DCI format is achieved).

6i. The apparatus according to supplement 6, wherein the length of the HPN field of the control information is M, and the total number of SPS configuration sets to which the HPN field corresponds is at most $2^M$.

6j. The apparatus according to supplement 6, the receiving unit further receives second configuration information, the second configuration information being used to indicate the terminal equipment to generate two HARQ-ACK codebooks.

7. The apparatus according to supplement 6, wherein that the determining unit determines a priority of HARQ-ACK information to which the control information corresponds according to the SPS configuration set includes:

that the determining unit determines the priority of the HARQ-ACK information to which the control information corresponds according to an SPS configuration in the SPS configuration set.

7a. The apparatus according to supplement 7, wherein the priority of the HARQ-ACK information to which the control information corresponds is one of the following:

a highest priority in priorities to which SPS configurations in the SPS configuration set correspond;

a lowest priority in priorities to which SPS configurations in the SPS configuration set correspond;

a priority to which an SPS configuration with a lowest SPS configuration index in the SPS configuration set corresponds;

a priority to which an SPS configuration with a highest SPS configuration index in the SPS configuration set corresponds; and a priority to which a recently activated SPS configuration in the SPS configuration set corresponds.

7b. The apparatus according to supplement 7, wherein the SPS configuration in the SPS configuration set refers to:

an activated/active SPS configuration in the SPS configuration set.

7c. The apparatus according to supplement 7a, wherein the recently activated SPS configuration in the SPS configuration set refers to:

an SPS configuration that is recently activated in the activated/active SPS configurations in the SPS configuration set.

7d. The apparatus according to supplement 7b or 7c, wherein the activated/active SPS configuration refers to, a first SPS configuration; wherein, the receiving unit receives an SPS PDSCH in a first slot according to information on the first SPS configuration, and the SPS PDSCH reception is activated in the first slot; wherein, the first slot refers to:

a recent slot earlier than or not later than a slot where the control information is located and used for receiving the SPS PDSCH to which the first SPS configuration corresponds.

8. The apparatus according to supplement 6, wherein that the determining unit determines an HARQ-ACK codebook of HARQ-ACK information to which the control information corresponds according to the SPS configuration set includes:

that the determining unit determines the HARQ-ACK codebook of the HARQ-ACK information to which the control information corresponds according to an HARQ-ACK codebook to which an SPS configuration in the SPS configuration set corresponds.

8a. The apparatus according to supplement 8, wherein the HARQ-ACK codebook of the HARQ-ACK information to which the control information corresponds is one of the following:

an HARQ-ACK codebook of a highest priority or a highest priority index to which the SPS configurations in the SPS configuration set correspond;

an HARQ-ACK codebook of a lowest priority or a lowest priority index to which the SPS configurations in the SPS configuration set correspond;

an HARQ-ACK codebook to which an SPS configuration of a lowest SPS configuration index in the SPS configuration set corresponds;

an HARQ-ACK codebook to which an SPS configuration of a highest SPS configuration index in the SPS configuration set corresponds; and an HARQ-ACK codebook to which a recently activated SPS configuration in the SPS configuration set corresponds.

8b. The apparatus according to supplement 8, wherein the SPS configuration in the SPS configuration set refers to:

an activated/active SPS configuration in the SPS configuration set.

8c. The apparatus according to supplement 8a, wherein the recently activated SPS configuration in the SPS configuration set refers to:

an SPS configuration that is recently activated in the activated/active SPS configurations in the SPS configuration set.

8d. The apparatus according to supplement 8b or 8c, wherein the activated/active SPS configuration refers to:

a first SPS configuration; wherein, the terminal equipment receives an SPS PDSCH in a first slot according to information on the first SPS configuration, and the SPS PDSCH reception is activated in the first slot; wherein, the first slot refers to:

a recent slot earlier than or not later than a slot where the control information is located and used for receiving the SPS PDSCH to which the first SPS configuration corresponds.

9. The apparatus according to supplement 6, wherein, a mapping relationship between the SPS configuration set and the priority or HARQ-ACK codebook of the HARQ-ACK information to which the control information corresponds is indicated by configuration information.

10. The apparatus according to supplement 6, wherein the apparatus further includes:

a transmitting unit configured to transmit a signal used for carrying the HARQ-ACK information to which the control information corresponds at a corresponding time-domain position according to the priority or HARQ-ACK codebook of the HARQ-ACK information to which the control information corresponds.

11. The apparatus according to supplement 10, wherein, PUCCH parameter configuration information to which the priority or HARQ-ACK codebook corresponds does not include or is not configured with an indication on the length of a sub-slot, and the transmitting unit transmits the signal in units of slots.

12. The apparatus according to supplement 10, PUCCH parameter configuration information to which the priority or HARQ-ACK codebook corresponds includes or is configured with an indication on the length of a sub-slot, and the transmitting unit transmits the signal in units of sub-slots.

13. A wireless communication apparatus, configured in a terminal equipment, wherein the apparatus includes:

a receiving unit configured to receive first configuration information and control information, the first configuration information indicating a list, the list being associated with one or more than one SPS configuration set, and the control information corresponding to one of the SPS configuration sets; and a determining unit configured to determine a priority or an HARQ-ACK codebook of HARQ-ACK information to which the control information corresponds according to the control information.

13a. The apparatus according to supplement 13, wherein, the SPS configuration set is associated with one or more than one SPS configuration.

13b. The apparatus according to supplement 13, wherein the first configuration information acts on a bandwidth part.

13c. The apparatus according to supplement 13, wherein the control information corresponding to an SPS configuration set includes:

that an HPN field of the control information indicates the SPS configuration set.

13d. The apparatus according to supplement 13, wherein, the CRC of the control information is scrambled by a CS-RNTI.

13e. The apparatus according to supplement 13, wherein, a new data indicator field of the control information is 0.

13f. The apparatus according to supplement 13, wherein, the control information includes a redundancy version field; all bits to which a modulation and coding scheme field of the control information corresponds are 1; all bits to which a frequency-domain resource assignment field of the control information corresponds are 1; and all bits to which the redundancy version field of the control information corresponds are 0.

13g. The apparatus according to supplement 13, wherein, the control information does not include a redundancy version field; all bits to which a modulation and coding scheme field of the control information corresponds are 1; and all bits to which a frequency-domain resource assignment field of the control information corresponds are 1.

13h. The apparatus according to supplement 13f or 13g, wherein, the validation of the control information is achieved (the validation of the DCI format is achieved).

13i. The apparatus according to supplement 13, wherein the length of the HPN field of the control information is M, and the total number of SPS configuration sets to which the HPN field corresponds is at most $2^M$.

13j. The apparatus according to supplement 13, the receiving unit further receives second configuration information, the second configuration information being used to indicate the terminal equipment to generate two HARQ-ACK codebooks.

14. The apparatus according to supplement 13, wherein that the determining unit determines a priority of HARQ-ACK information to which the control information corresponds according to the control information includes one of the following that:

the determining unit determines the priority of the HARQ-ACK information to which the control information corresponds according to a format (DCI format) of the control information;

the determining unit determines the priority of the HARQ-ACK information to which the control information corresponds according to a CRC scrambling RNTI of the control information;

the determining unit determines the priority of the HARQ-ACK information to which the control information corresponds according to a control resource set (CORESET) or search space (SS) of the control information; and the determining unit determines the priority of the HARQ-ACK information to which the control information corresponds according to a field of the control information.

15. The apparatus according to supplement 13, that the determining unit determines an HARQ-ACK codebook of HARQ-ACK information to which the control information corresponds according to the control information includes one of the following that: the determining unit determines the HARQ-ACK codebook of the HARQ-ACK information to which the control information corresponds according to a format (DCI format) of the control information; the determining unit determines the HARQ-ACK codebook of the HARQ-ACK information to which the control information corresponds according to a CRC scrambling RNTI of the control information; the determining unit determines the HARQ-ACK codebook of the HARQ-ACK information to which the control information corresponds according to a control resource set (CORESET) or search space (SS) of the control information; and the determining unit determines the HARQ-ACK codebook of the HARQ-ACK information to which the control information corresponds according to a field of the control information.

16. The apparatus according to supplement 13, wherein the apparatus further includes:

a transmitting unit configured to transmit a signal used for carrying the HARQ-ACK information to which the control information corresponds at a corresponding time-domain position according to the priority or HARQ-ACK codebook of the HARQ-ACK information to which the control information corresponds.

17. The apparatus according to supplement 16, wherein, PUCCH parameter configuration information to which the priority or HARQ-ACK codebook corresponds does not include or is not configured with an indication on the length of a sub-slot, and the transmitting unit transmits the signal in units of slots.

18. The apparatus according to supplement 16, PUCCH parameter configuration information to which the priority or HARQ-ACK codebook corresponds includes or is configured with an indication on the length of a sub-slot, and the transmitting unit transmits the signal in units of sub-slots.

19. A wireless communication apparatus, configured in a network device, wherein the apparatus comprises:

a transmitting unit configured to transmit first configuration information to a terminal equipment, the first configuration information indicating that one or more than one SPS configuration is associated with an SPS configuration set, the one or more than one SPS configuration corresponding to identical priorities or identical HARQ-ACK codebooks.

19a. The apparatus according to supplement 19, wherein the first configuration information acts on a bandwidth part.

19b. The method according to supplement 19, wherein the transmitting unit further transmits second configuration information to the terminal equipment, the second configuration information being used to indicate the terminal equipment to generate two HARQ-ACK codebooks.

20. The apparatus according to supplement 19, wherein, the transmitting unit further transmits control information to the terminal equipment, an HPN field of the control information indicating the SPS configuration set;

and the apparatus further includes:

a receiving unit configured to receive a signal used for carrying the HARQ-ACK information to which the control information corresponds at a corresponding time-domain position according to the priority or HARQ-ACK codebook to which the one or more than one SPS configuration corresponds.

20a. The apparatus according to supplement 20, wherein, the CRC of the control information is scrambled by a CS-RNTI.

20b. The apparatus according to supplement 20, wherein, a new data indicator field of the control information is 0.

20c. The apparatus according to supplement 20, wherein, all bits to which a modulation and coding scheme field of the control information corresponds are 1; all bits to which a frequency-domain resource assignment field of the control information corresponds are 1; the control information includes a redundancy version field; and all bits to which the redundancy version field corresponds are 0.

20d. The apparatus according to supplement 20, wherein, all bits to which the modulation and coding scheme field of the control information corresponds are 1; all bits to which the frequency-domain resource assignment field of the control information corresponds are 1; and the control information includes no redundancy version field.

20e. The apparatus according to supplement 20c or 20d, wherein, the validation of the control information is achieved (the validation of the DCI format is achieved).

20f. The apparatus according to supplement 20, wherein the length of the HPN field of the control information is M, and a total number of SPS configuration sets to which the HPN field corresponds is at most $2^M$.

21. The apparatus according to supplement 20, wherein the receiving a signal used for carrying the HARQ-ACK information to which the control information corresponds at a corresponding time-domain position includes that:

PUCCH parameter configuration information to which the priority or HARQ-ACK codebook corresponds does not include or is not configured with an indication on the length of a sub-slot, and the receiving unit receives the signal in units of slots.

22. The apparatus according to supplement 20, wherein the receiving a signal used for carrying the HARQ-ACK information to which the control information corresponds at a corresponding time-domain position includes that:

PUCCH parameter configuration information to which the priority or HARQ-ACK codebook corresponds includes or is configured with an indication on the length of a sub-slot, and the receiving unit receives the signal in units of sub-slots.

What is claimed is:

1. A wireless communication apparatus, configured in a terminal equipment, the apparatus comprising:

a receiver configured to:

receive first configuration information from a network device, the first configuration information indicating that multiple SPS configurations are associated with an SPS deactivate state, all the multiple SPS configurations associated with the SPS deactivate state are configured with an identical HARQ-ACK codebook index, wherein the HARQ-ACK codebook index is one of two types of HARQ-ACK codebook indices corresponding to two priority indices, respectively; and receive second configuration information from the network device, the second configuration information being used to indicate the terminal equipment to generate two HARQ-ACK codebooks.

2. The wireless communication apparatus according claim 1, wherein the first configuration information is first RRC (Radio Resource Control) information, and the second configuration information is second RRC information, and includes a list of configuration for at least two simultaneously constructed HARQ-ACK codebooks which includes the two HARQ-ACK codebooks.

3. A wireless communication apparatus, configured in a network device, the apparatus comprising:

a transmitter configured to:

transmit first configuration information to a terminal equipment, the first configuration information indicating that multiple SPS configurations are associated with an SPS deactivation state, all the multiple SPS configurations associated with the SPS deactivate state are configured with an identical HARQ-ACK codebook index, wherein the HARQ-ACK codebook index is one of two types of HARQ-ACK codebook indices corresponding to two priority indices, respectively; and transmit second configuration information to the terminal equipment, the second configuration information being used to indicate the terminal equipment to generate two HARQ-ACK codebooks.

4. The wireless communication apparatus according claim 3, wherein the first configuration information is first RRC (Radio Resource Control) information, and the second configuration information is second RRC information, and includes a list of configuration for at least two simultaneously constructed HARQ-ACK codebooks which includes the two HARQ-ACK codebooks.

\* \* \* \* \*